United States Patent
Tanaka et al.

(10) Patent No.: US 8,426,632 B2
(45) Date of Patent: Apr. 23, 2013

(54) CROSSLINKING AGENT, CROSSLINKED POLYMER, AND USES THEREOF

(75) Inventors: Shinichi Tanaka, Osaka (JP); Hideki Kageyama, Osaka (JP); Hiroyuki Ono, Osaka (JP); Akiko Kuruma, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 511 days.

(21) Appl. No.: 12/675,567

(22) PCT Filed: Aug. 29, 2008

(86) PCT No.: PCT/JP2008/065497
§ 371 (c)(1),
(2), (4) Date: Feb. 26, 2010

(87) PCT Pub. No.: WO2009/028646
PCT Pub. Date: Mar. 5, 2009

(65) Prior Publication Data
US 2010/0209723 A1    Aug. 19, 2010

(30) Foreign Application Priority Data

| Aug. 31, 2007 | (JP) | 2007-225012 |
| Mar. 18, 2008 | (JP) | 2008-069645 |
| Apr. 4, 2008 | (JP) | 2008-098282 |
| Apr. 11, 2008 | (JP) | 2008-103494 |
| Apr. 24, 2008 | (JP) | 2008-114149 |
| Apr. 24, 2008 | (JP) | 2008-114150 |

(51) Int. Cl.
C07C 69/72    (2006.01)
C07C 59/153    (2006.01)

(52) U.S. Cl.
USPC .......................................... 560/178; 562/577

(58) Field of Classification Search ........................ None
See application file for complete search history.

(56) References Cited

U.S. PATENT DOCUMENTS

| 3,000,888 | A | * | 9/1961 | Biekert | 544/140 |
| 4,443,623 | A | * | 4/1984 | Photis | 560/170 |
| 4,692,547 | A | * | 9/1987 | Driscoll et al. | 560/186 |
| 4,760,168 | A | * | 7/1988 | Schirmann | 560/170 |
| 5,128,452 | A | * | 7/1992 | Hai et al. | 530/385 |
| 2004/0102586 | A1 | | 5/2004 | Leinweber et al. | |
| 2009/0269378 | A1 | | 10/2009 | Hueffer et al. | |

FOREIGN PATENT DOCUMENTS

| JP | 55-47149 | 4/1980 |
| JP | 7-198945 | 8/1995 |
| JP | 8-325427 | 12/1996 |
| JP | 9-124553 | 5/1997 |
| JP | 9-124874 | 5/1997 |
| JP | 9-164763 | 6/1997 |
| JP | 11-279509 | 10/1999 |
| JP | 2003-300926 | 10/2003 |
| JP | 2004-124028 | 4/2004 |
| JP | 2004-291519 | 10/2004 |
| WO | 2005/087711 | 9/2005 |
| WO | 2005/113570 | 12/2005 |
| WO | 2006/059903 | 6/2006 |

OTHER PUBLICATIONS

"Database WPI Week 198020", Thomson Scientific, London, GB; AN 1980-35516C XP002607951.
Search report from E.P.O., mail date is Nov. 26, 2010.
International Search Report dated Nov. 18, 2008 that issued with respect to PCT/JP2008/065497.

* cited by examiner

*Primary Examiner* — Paul A Zucker
(74) *Attorney, Agent, or Firm* — Greenblum & Bernstein, P.L.C.

(57) ABSTRACT

There is provided a novel crosslinking agent for use in crosslinked polymer fabrication, specifically a crosslinking agent containing at least one compound selected from glyoxylate and a glyoxylic acid ester derivative represented by the following general formula (1):

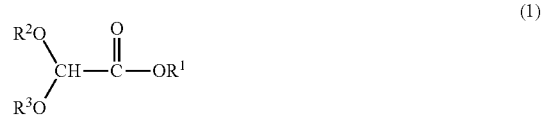

wherein $R^1$ and $R^2$ each independently represents an alkyl group having 1 to 10 carbon atoms and $R^3$ represents hydrogen or an alkyl group having 1 to 10 carbon atoms.

4 Claims, 8 Drawing Sheets

CROSSLINKING AGENT, CROSSLINKED POLYMER, AND USES THEREOF

TECHNICAL FIELD

The present invention relates to a crosslinking agent, a crosslinked polymer crosslinked with such a crosslinking agent, and uses thereof.

BACKGROUND ART

In crosslinked polymers, since movement of the molecular chains is restrained in three-dimensional directions, the polymers are usually more excellent in strength, heat resistance, solvent resistance, and the like than linear polymers of the same type.

Such crosslinked polymers are roughly classified into (i) those each obtained by converting a monomer into a high molecular compound with a crosslinking agent through three-dimensional crosslinking and (ii) those each obtained by intermolecular crosslinking of a linear polymer with a crosslinking agent.

With regard to the crosslinked polymers of (i), most of them are obtained by fabricating a crosslinkable monomer through a reaction of a monomer with a crosslinking agent beforehand and crosslinking the crosslinkable monomer by heating or by means of a catalyst, and representative examples thereof include thermosetting resins such as urea resins, melamine resins, and phenol resins. In all these resins, a crosslinked structure is fabricated by adding an aldehyde compound such as formaldehyde as a crosslinking agent to ureas, melamines, or phenols as a monomer to form a methylol group and subjecting the methylol groups to a condensation reaction.

Moreover, with regard to (ii), crosslinking methods of various liner polymers have been investigated and put into practical use. Of these, a polyvinyl alcohol-based resin (hereinafter polyvinyl alcohol is abbreviated as PVA), which is a water-soluble resin, is a resin to which water resistance can be imparted by crosslinking and thus is one kind of resins where crosslinked structure fabrication is practically extremely important.

In the case of the PVA-based resin, examples wherein a hydroxyl group bonded to the main chain is used for crosslinking are widely known. However, in order to enhance crosslinking efficiency and fabricate a strong crosslinked structure, it is preferable to use a PVA-based resin wherein a highly reactive functional group is introduced into the side chain. For example, a PVA-based resin having an acetoacetyl group in the side chain has been employed in uses where a high water resistance is required.

As crosslinking agents for the acetoacetyl group-containing PVA-based resin (hereinafter, the acetoacetyl group-containing resin is abbreviated as AA-PVA-based resin), various compounds are known. Of these, aldehyde compounds have been widely used in various uses since they are excellent in reactivity with the acetoacetyl group and a crosslinking reaction proceeds at relatively low temperature.

For example, a crosslinked polymer obtained by crosslinking the AA-PVA-based resin with glyoxal which is a dialdehyde compound is suitably used in a surface protecting layer of heat-sensitive recording media (see e.g., Patent Document 1), an adhesive layer between a polarizing film and a protecting film in polarizers (see e.g., Patent Document 2), and the like.

Moreover, in an aqueous emulsion obtained using a polymer containing a repeating structural unit derived from an ethylenically unsaturated monomer as a dispersoid and the AA-PVA-based resin as a dispersant, an example wherein water resistance is imparted to a dry film of the emulsion by the use of glyoxal as a crosslinking agent (see e.g., Patent Document 3).

Furthermore, in recent years, for the purpose of extending a pot life of a mixed aqueous solution of the AA-PVA-based resin and an aldehyde compound, it is investigated to use a compound whose aldehyde group is protected. For example, there has been proposed a heat-sensitive recording medium wherein an acetal compound obtained by protecting an aldehyde group with a polyhydric alcohol such as glucose is used as a crosslinking agent for the AA-PVA-based resin (see e.g., Patent Document 4).

Patent Document 1: JP-A-09-164763
Patent Document 2: JP-A-07-198945
Patent Document 3: JP-A-11-279509
Patent Document 4: JP-A-2004-291519

DISCLOSURE OF THIS INVENTION

Problems that the Invention is to Solve

As above, aldehyde compounds have been widely used as crosslinking agents for thermosetting resins such as phenol resins and crosslinking agents for linear polymers, especially AA-PVA-based resins. However, formaldehyde, which is a representative compound thereof, has an extremely strong irritating odor and thus it may make working environment worse and may remain in products to cause a bad odor in some cases.

Moreover, in the case where an aldehyde compound is used as a crosslinking agent for the AA-PVA-based resin, the both substances are usually applied to various uses after they are made into an aqueous solution containing them. In that case, since an aldehyde group is highly reactive with an acetoacetyl group, a crosslinking reaction may proceed at room temperature to thicken the aqueous solution during use or during storage and thus workability may decrease or finally the solution may become a gel and impossible to use in some cases.

Furthermore, a crosslinked polymer obtained by crosslinking the AA-PVA-based resin with an aldehyde compound frequently used at present, such as formaldehyde or glyoxal, has a problem that it may be colored with time depending on its storage environment.

In this regard, in Patent Document 4, a compound wherein the aldehyde group of formaldehyde is acetalized with a polyol compound such as glucose is proposed as a crosslinking agent for the AA-PVA-based resin. However, in the case where such a compound is used as a crosslinking agent, stability of a mixed aqueous solution with the AA-PVA-based resin and coloring resistance with time of the resulting crosslinked polymer are slightly enhanced but there is yet a room for improvement.

Namely, an object of the invention is to provide an aldehyde-based crosslinking agent for use in crosslinked polymer fabrication, which has no odor and excellent in safety and which, in the case of use as a crosslinking agent for the AA-PVA-based resin, is excellent in stability of a mixed aqueous solution therewith and affords a crosslinked polymer excellent in water resistance and exhibiting a small coloring with time.

Means for Solving the Problems

As a result of the extensive studies in consideration of the above circumstances, the present inventors have found that the object of the invention is achieved by a crosslinking agent containing at least one compound selected from glyoxylate and a glyoxylic acid ester derivative represented by the following general formula (1), and thus the invention has been accomplished.

[Chem. 1]

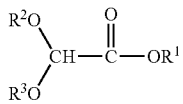

(1)

wherein $R^1$ and $R^2$ each independently represents an alkyl group having 1 to 10 carbon atoms and $R^3$ represents a hydrogen atom or an alkyl group having 1 to 10 carbon atoms.

A gist of the invention is shown as follows.

[1] A crosslinking agent containing at least one compound selected from glyoxylate and a glyoxylic acid ester derivative represented by the following general formula (1):

[Chem. 2]

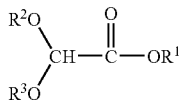

(1)

wherein $R^1$ and $R^2$ each independently represents an alkyl group having 1 to 10 carbon atoms and $R^3$ represents a hydrogen atom or an alkyl group having 1 to 10 carbon atoms.

[2] The crosslinking agent according to [1], wherein the glyoxylate is at least one metal salt of glyoxylic acid selected from an alkali metal salt of glyoxylic acid and an alkaline earth metal salt of glyoxylic acid.

[3] The crosslinking agent according to [1], wherein the glyoxylic acid ester derivative represented by the general formula (1) contains a hemiacetal compound represented by the following general formula (1a):

[Chem. 3]

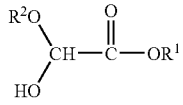

(1a)

wherein $R^1$ and $R^2$ each independently represents an alkyl group having 1 to 10 carbon atoms.

[4] The crosslinking agent according to [3], wherein the glyoxylic acid ester derivative represented by the general formula (1) contains the hemiacetal compound represented by the general formula (1a) and an acetal compound represented by the following general formula (1b):

[Chem. 4]

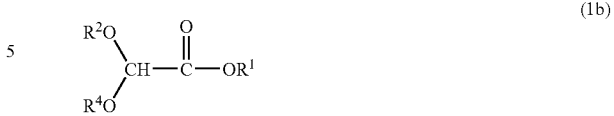

(1b)

wherein $R^1$, $R^2$, and $R^4$ each independently represents an alkyl group having 1 to 10 carbon atoms.

[5] The crosslinking agent according to [4], wherein a content ratio (1a)/(1b) of the hemiacetal compound represented by the general formula (1a) to the acetal compound represented by the general formula (1b) is 80/20 to 99.9/0.1 in terms of a weight ratio.

[6] A crosslinked polymer, which is obtained by crosslinking, with the crosslinking agent according to any one of [1] to [5], a compound capable of fabricating a crosslinked structure through a reaction with the crosslinking agent.

[7] The crosslinked polymer according to [6], wherein the compound capable of fabricating a crosslinked structure through a reaction with the crosslinking agent is a phenol.

[8] The crosslinked polymer according [6], wherein the compound capable of fabricating a crosslinked structure through a reaction with the crosslinking agent is an acetoacetyl group-containing resin.

[9] The crosslinked polymer according to [8], wherein the acetoacetyl group-containing resin is an acetoacetyl group-containing polyvinyl alcohol-based resin.

[10] A polarizer comprising a polarizing film, an adhesive layer containing the crosslinked polymer according to [9], and a protective film in this order.

[11] A heat-sensitive recording medium comprising a layer containing the crosslinked polymer according to [9] on a supporting base material.

[12] An aqueous emulsion composition comprising an acetoacetyl group-containing polyvinyl alcohol-based resin as a dispersant, a polymer containing a repeating structural unit derived from an ethylenically unsaturated monomer as a dispersoid, and the crosslinking agent according to any one of [1] to [5].

[13] An aqueous emulsion composition comprising an acetoacetyl group-containing resin as a dispersoid and the crosslinking agent according to any one of [1] to [5].

Such glyoxylate has an aldehyde group in the molecule and functions as a crosslinking agent for monomers such as ureas, melamines, and phenols or functional groups of linear polymers, especially an acetoacetyl group through a reaction of the aldehyde group with the monomers or the functional groups.

Moreover, the glyoxylic acid ester derivative represented by the general formula (1) is a compound having a hemiacetal group or an acetal group formed by a reaction of the aldehyde group in the glyoxylic acid ester with one molecule or two molecules of an alcohol and functions as a crosslinking agent for the aforementioned various monomers or various functional groups through a reaction thereof with the hemiacetal group or acetal group directly or after the alcohol is eliminated to form the aldehyde group.

Furthermore, such at least one compound selected from the glyoxylate and the glyoxylic acid ester derivative represented by the general formula (1) is contained as an active component in the crosslinking agent. In this regard, the active component refers to an amount at which the compound functions as a crosslinking agent, and a specific amount is not categorically determined but is the range of usually 60 to 100% by weight, preferably 70 to 100% by weight based on the whole amount.

Advantage of the Invention

The crosslinking agent of the invention is suitable as an aldehyde-based crosslinking agent for use in crosslinked polymer fabrication and has characteristics that it has no odor and is excellent in safety as compared with formaldehyde which is frequently used in such uses.

Moreover, the crosslinking agent of the invention is useful as a crosslinking agent for linear polymers, especially AA-PVA-based resins and has properties that it is excellent in crosslinking reactivity, a crosslinked polymer excellent in water resistance is obtained, and also a mixed aqueous solution thereof with the AA-PVA-based resin is excellent in viscosity stability and exhibits a long pot life. In addition, the resulting crosslinked polymer has characteristics that it is excellent in water resistance and coloring with time is extremely little.

In this regard, glyoxylic acid is known as a crosslinking agent for AA-PVA-based resins but a crosslinked polymer of the AA-PVA-based resin with glyoxylic acid does not exhibit a sufficient water resistance. On the contrary, when the crosslinking agent of the invention containing glyoxylate or a glyoxylic acid ester derivative represented by the general formula (1) as an active component is used, a crosslinked polymer excellent in water resistance is obtained. It is presumed that this is because the carboxylate group derived from the glyoxylate introduced into the crosslinked structure is less hydrophilic than the carboxylic acid group, from the presumption that, in the case of glyoxylate, water solubility of the glyoxylate is remarkably little as compared with glyoxylic acid.

Moreover, in the case of the glyoxylic acid ester derivative represented by the general formula (1), since it has an carboxylic acid ester group excellent in affinity to the hydroxyl group and acetoacetyl group in the AA-PVA-based resin, it is presumed that the derivative homogeneously dissolves in the PVA-based resin and, as a result, it is attributable to the fact that a crosslinked structure having a little unevenness in crosslinking density is fabricated.

In addition, the crosslinking agent of the invention is excellent in viscosity stability at the time when it is made into a mixed aqueous solution with the AA-PVA-based resin. As a reasons for it, it is presumed that, in the case of the glyoxylate, the carboxylate group in the molecule is ionized in the aqueous solution to form a carboxylic acid ion ($COO^-$), thereby electron density of the aldehyde carbon is enhanced, and as a result, it becomes difficult to undergo nucleophilic attack by the active methylene of the acetoacetyl group.

Furthermore, in the case of the glyoxylic acid ester derivative represented by the general formula (1), since the ester group in the molecule is an electron-withdrawing group and stabilizes the acetal structure, it is presumed that the derivative contributes to the improvement of stability through suppression of the reaction with the acetoacetyl group in the aqueous solution.

BEST MODE FOR CARRYING OUT THE INVENTION

Figure 1:
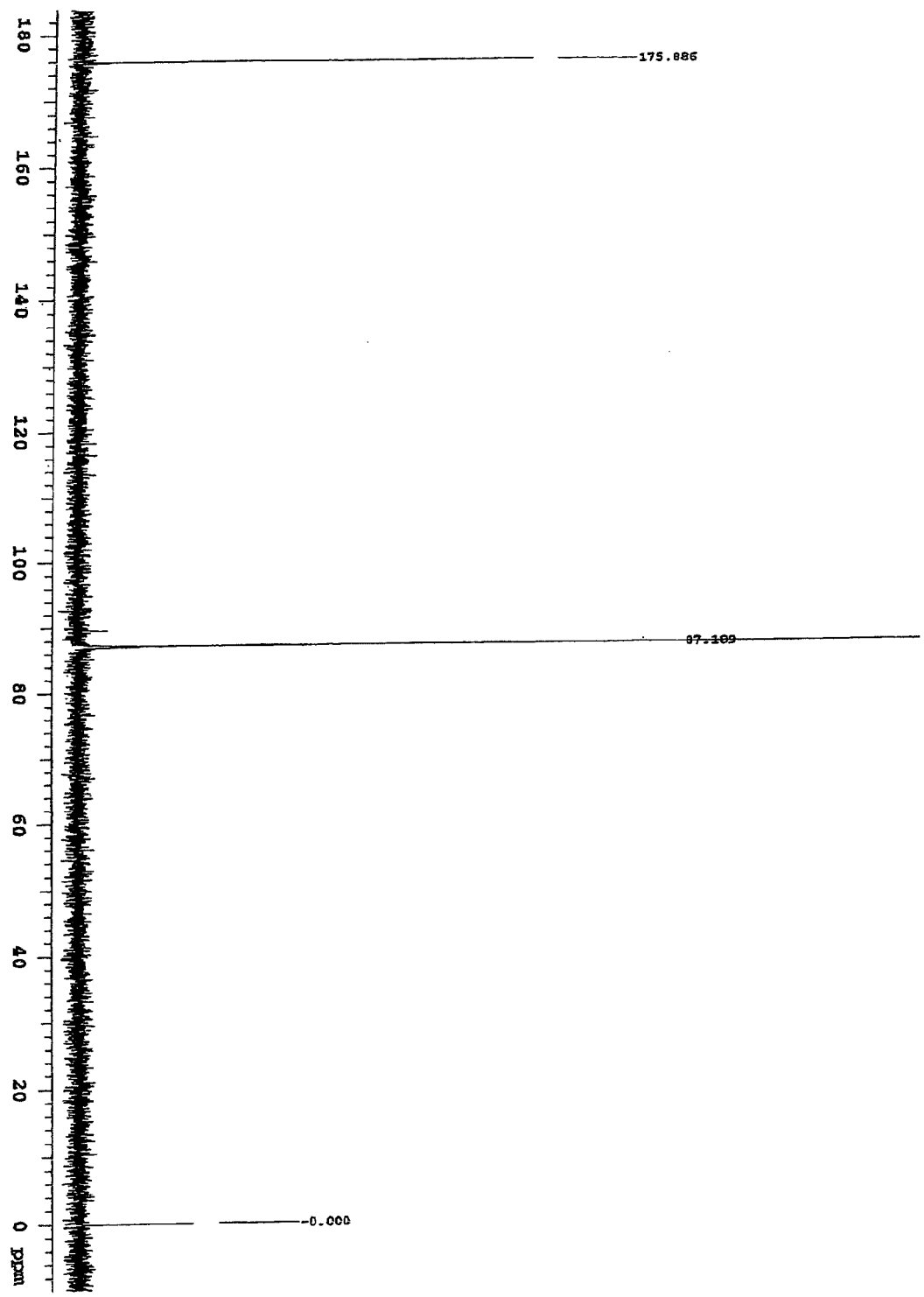
[FIG. 1] $^{13}$C-NMR spectrum of a crosslinking agent (A1) (sodium glyoxylate)

The explanation of constitutional requirements to be described below is one example (representative example) of the embodiments of the invention and the invention is not specified to the content thereof.

The following will describe the invention in detail.

The crosslinking agent of the invention is a crosslinking agent containing at least one compound selected from glyoxylate and a glyoxylic acid ester derivative represented by the general formula (1).

[Glyoxylate]

First, glyoxylate to be contained in the crosslinking agent of the invention as an active component will be described.

As the glyoxylate, various ones may be mentioned and metal salts of alkali metals with glyoxylic acid, metal salts of alkaline earth metals with glyoxylic acid, salts of amines with glyoxylic acid, and the like may be mentioned. Preferably, the salt is at least one metal salt of glyoxylic acid selected from the metal salts of alkali metals with glyoxylic acid and the metal salts of alkaline earth metals with glyoxylic acid. As the metal salts of alkali metals with glyoxylic acid, there may be, for example, mentioned metal salts of alkali metals such as sodium and potassium with glyoxylic acid, as metal salts of alkaline earth metals with glyoxylic acid, there may be mentioned metal salts of alkaline earth metals such as magnesium and calcium with glyoxylic acid, and as metal salts of amines with glyoxylic acid, there may be mentioned salts of amines such as ammonia, monomethylamine, dimethylamine and trimethylamine with glyoxylic acid.

Particularly, in the invention, it is considered that lesser hydrophilicity of the carboxylate group to be introduced into the crosslinked structure as compared with the carboxylic acid group contributes to the enhancement in water resistance of the crosslinked polymer. Thus, as the glyoxylate, glyoxylate having a smaller solubility in water is preferable. Specifically, one having a solubility of 0.01 to 100%, particularly 0.1 to 50%, and further 0.5 to 20% in water at 23° C. is preferably used. Specific examples of the glyoxylate having a smaller solubility in water include sodium glyoxylate (solubility: about 17%), calcium glyoxylate (solubility: about 0.7%), and the like.

As processes for producing the glyoxylate, known processes can be used and examples thereof include (1) a process by a neutralization reaction of glyoxylic acid, (2) a process by a ion-exchange reaction of glyoxylic acid with a salt of an acid having an acid dissociation constant larger than that of glyoxylic acid, (3) a process by alkaline hydrolysis of a glyoxylic acid ester (see e.g., JP-A-2003-300926), and the like.

Particularly, the process of (1) is preferably used in the case where the water solubility of an alkaline compound to be used in the neutralization reaction with glyoxylic acid is high, and the process of (2) is preferably used in the case where the water solubility of the resulting glyoxylate is low and the water solubility of the salt of the acid having an acid dissociation constant larger than that of glyoxylic acid is high.

In this regard, the process of (1) is usually performed using water as a medium and the production can be carried out by reacting glyoxylic acid with an alkaline compound, e.g., an alkali metal hydroxide or an alkaline earth metal hydroxide in water and filtering and drying the precipitated glyoxylate.

Moreover, the process of (2) is also generally performed in water and the glyoxylate can be obtained in the same manner as in the process of (1). In this regard, examples of the salt of the acid having an acid dissociation constant larger than that of glyoxylic acid to be used in the process of (2) include alkali metal or alkaline earth metal salts of aliphatic carboxylic acids, such as sodium acetate, calcium acetate, and calcium propionate.

Furthermore, after the glyoxylate is synthesized, it is possible to use the formed glyoxylate as it is with carrying out the aforementioned reaction of (1) or (2) without isolating the salt.

In this regard, in the case where the glyoxylate is used as an active component of the crosslinking agent of the invention, there is a possibility that raw materials for use in the production of the glyoxylate, impurities contained in the raw materials, by-products, and the like may be contained in the crosslinking agent. For example, there is a case where glyoxylic acid, an alkali metal hydroxide, an alkaline earth metal hydroxide, an aliphatic carboxylate of an alkali metal, an aliphatic carboxylate of an alkaline earth metal, glyoxal, oxalic acid, an oxalate, and the like may be contained in some cases.

Particularly, in the case where glyoxylic acid is used as a raw material, there is a possibility that glyoxal which is a by-product at the production of the glyoxylate is contained in the crosslinking agent and the content of such glyoxal is most desirably 0% by weight, and is preferably 5% by weight or less, particularly 2% by weight or less, and further 1% by weight or less. When the content of glyoxal is large, stability of an aqueous solution mixed with the AA-PVA-based resin decreases and a pot life is shortened, and the resulting crosslinked polymer of the AA-PVA-based resin is colored with time in some cases depending on the storage conditions.

Moreover, in the invention, the glyoxylate includes compounds wherein the aldehyde group is acetalized or hemiacetalized with an alcohol having 3 or less carbon atoms, such as methanol or ethanol, a diol having 3 or less carbon atoms, such as ethylene glycol or propylene glycol, or the like. Since the acetal group or hemiacetal group easily eliminates the alcohol in water or under high temperature and is equilibrated with the aldehyde group, it reacts with various monomers similarly to the aldehyde group and thus the compounds function as crosslinking agents.

[Glyoxylic Acid Ester Derivative]

The following will describe the glyoxylic acid ester derivative, which is another compound to be contained in the crosslinking agent of the invention as an active component.

The glyoxylic acid ester derivative for use in the invention is represented by the following general formula (1) and, in the formula, $R^1$ and $R^2$ each independently represents an alkyl group having 1 to 10 carbon atoms and $R^3$ represents a hydrogen atom or an alkyl group having 1 to 10 carbon atoms. Of these, a hemiacetal compound represented by the following general formula (1a) wherein $R^1$ and $R^2$ each independently represents an alkyl group having 1 to 10 carbon atoms and $R^3$ represents a hydrogen atom is preferably used.

[Chem. 5]

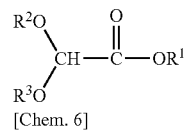
(1)

[Chem. 6]

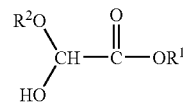
(1a)

In this regard, in the case where $R^1$ to $R^3$ each independently represents an alkyl group, one having 1 to 5 carbon atoms, further 1 to 3 carbon atoms is preferable. When the number of the carbon atoms is too large, the molecular weight increases, so that efficiency of the crosslinking agent per a blended amount tends to decrease. Moreover, in the case where the present crosslinking agent is used as an aqueous solution, when the number of the carbon atoms in $R^1$ to $R^3$ increases, the crosslinking agent becomes hydrophobic and thus the solubility in water tends to decrease.

Specific examples of the hemiacetal compound represented by the general formula (1a) include methyl glyoxylate methyl hemiacetal, ethyl glyoxylate ethyl hemiacetal, propyl glyoxylate propyl hemiacetal, and the like. However, the examples are not limited to these compounds and, for example, even the compounds wherein a part of the hydrogen atoms in the alkyl group represented by $R^1$ and $R^2$ are substituted by other functional group(s) can be used so far as the object of the invention is not impaired.

Moreover, the hemiacetal compound of the invention may be one wherein $R^1$ in the ester group is the same as or different from $R^2$ in the hemiacetal group. Furthermore, the compound may be a mixture of plurality of hemiacetal compounds wherein $R^1$ or $R^2$ is different from each other.

The process for producing the hemiacetal compound represented by the general formula (1a) for use in the invention is not particularly limited and a known method may be used. However, one produced by any of the processes shown below is preferably used and, of these, the method of (A) is most preferably used owing to easiness and versatility.

(A) A method of adding an alcohol to an aqueous solution of glyoxylic acid and esterifying with no catalyst or in the presence of a catalyst such as zirconium sulfate.

(B) A method of oxidizing dialkyl tartrate using an oxidizing agent such as sodium periodate in a halogen-based solvent (see e.g., WO2005-113570).

(C) A method of converting a reaction mixture comprising oxonide obtained by ozone-oxidation of diethyl fumarate or dimethyl maleate in an ester-based solvent into a glyoxylic acid ester (see e.g., JP-A-9-124553).

A main product by the aforementioned production process is the hemiacetal compound represented by the general formula (1a) but an acetal compound represented by the following general formula (1b) wherein the aldehyde group is reacted with two molecules of the alcohol and a glyoxylic acid ester wherein the aldehyde group is not hemiacetalized and remains as by products are formed in some cases. A crosslinking agent containing the hemiacetal compound represented by the general formula (1a) and these by-products, particularly a crosslinking agent containing the hemiacetal compound represented by the general formula (1a) and the acetal compound represented by the general formula (1b) is also preferably used as the crosslinking agent of the invention.

[Chem. 7]

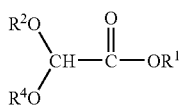

(1b)

wherein $R^1$, $R^2$, and $R^4$ each independently represents an alkyl group having 1 to 10 carbon atoms.

In this regard, these compounds represented by the general formulae (1a) and (1b) and the glyoxylic acid ester are usually present as an equilibrium mixture in water or under high temperature. The hemiacetal group in the hemiacetal compound represented by the general formula (1a), the acetal group in the acetal compound represented by the general formula (1b), and the aldehyde group of the glyoxylic acid ester all equally react with various monomers and functional groups and thus function as crosslinking agents.

In the case where the crosslinking agent containing the hemiacetal compound represented by the general formula (1a) and the acetal compound represented by the general formula (1b) is used, the content ratio (1a)/(1b) is usually 80/20 to 99.9/0.1 in terms of weight ratio and particularly, the crosslinking agent having the ratio of 90/10 to 99/1 is preferably used.

As mentioned above, the crosslinking agent of the invention is a crosslinking agent containing as an active component at least one compound selected from glyoxylate and a glyoxylic acid ester derivative represented by the general formula (1).

The content of at least one compound selected from the glyoxylate and the glyoxylic acid ester derivative represented by the general formula (1), which are active components in the crosslinking agent of the invention, is usually 60 to 100% by weight based on the whole amount, and particularly, the range of 70 to 100% by weight is preferably used.

In this regard, the content of the active components may be the content of each component alone or may be the content of the total in the case where both components are used in combination.

[Crosslinked Polymer]

The following will describe the crosslinked polymer obtained using the crosslinking agent of the invention. The crosslinked polymer of the invention is characterized in that a compound capable of fabricating a crosslinked structure through a reaction with the crosslinking agent of the invention is crosslinked with the crosslinking agent of the invention. As mentioned above, the crosslinked polymers are roughly classified into (i) those obtained by converting a monomer, which is a compound capable of fabricating a crosslinked structure through a reaction with a crosslinking agent, into a high molecular compound with a crosslinking agent through three-dimensional crosslinking and (ii) those obtained by intermolecular crosslinking of a linear polymer, which is a compound capable of fabricating a crosslinked structure through a reaction with a crosslinking agent, with a crosslinking agent.

[Crosslinked Polymer (Three-Dimensional Crosslinked Product of Monomer)]

First, the crosslinked polymer obtained by converting a monomer into a high-molecule compound with a crosslinking agent through three-dimensional crosslinking, so-called thermosetting type crosslinked polymer will be described.

In such a crosslinked polymer, the monomer is reacted with the crosslinking agent beforehand to form a crosslinkable monomer having a crosslinking group and the monomer is converted into the crosslinked polymer by heating or using a catalyst in many cases. The following will describe the crosslinkable monomer using the crosslinking agent of the invention.

As the monomer to be a raw material for the crosslinkable monomer, any monomer can be similarly used so long as it is employed for conventional thermosetting resins which use an aldehyde compound such as formaldehyde as a crosslinking agent. Specific examples include phenols, ureas, amine-based compounds such as melamines, ketone-based compounds such as acetone, and the like, and particularly, phenols are suitable.

As the crosslinked polymers, there may be mentioned phenol resins, urea resins, melamine resins, and the like. As phenols to be raw materials for the phenol resins, there may be mentioned phenol, alkylphenols such as o-cresol, m-cresol, p-cresol, o-ethylphenol, m-ethylphenol, p-ethylphenol, 2,3-xylenol, 2,5-xylenol, 3,5-xylenol, 3,4-xylenol, 2-propiophenol, 2-isopropylphenol, 3-propylphenol, 3-isopropylphenol, 4-propylphenol, 4-isopropylphenol, 2-sec-butylphenol, 2-tert-butylphenol, 3-sec-butylphenol, 3-tert-butylphenol, 4-sec-butylphenol, 4-tert-butylphenol, 3-cyclohexylphenol, 4-cyclohexylphenol, 2-dodecylphenol, 3-dodecylphenol, 4-dodecylphenol, 2-octadecylphenol, 3-octadecylphenol, 4-octadecylphenol, 2-isopropyl-5-methylphenol, 2-methyl-4-tert-butylphenol, 3-methyl-6-tert-butylphenol, 2,3,5-trimethylphenol, 2,3,5-triethylphenol, o-isopropenylphenol, m-isopropenylphenol, p-isopropenylphenol, 2-methyl-4-isopropenylphenol, and 2-ethyl-4-isopropenylphenol, halogenated phenols such as fluorophenol, chlorophenol, bromophenol, and iodophenol, phenylphenols such as 2-phenylphenol, 3-phenylphenol, and 4-phenylphenol, naphthylphenols such as 2-naphthylphenol, 3-naphthylphenol, and 4-naphthylphenol, alkoxyphenols such as o-methoxyphenol, m-methoxyphenol, p-methoxyphenol, o-ethoxyphenol, m-ethoxyphenol, p-ethoxyphenol, o-propoxyphenol, m-propoxyphenol, and p-propoxyphenol, polyhydroxyphenols such as bisphenol A, bisphenol F, bis(2-methylphenol) A, bis(2-methylphenol) F, bisphenol S, bisphenol E, bisphenol Z, 4,4'-dihydroxybiphenyl, resorcinol, hydroquinone, and pyrogallol, naphthalenes such as α-naphthol, β-naphthol, and dihydroxynaphthalene, and the like but the phenols are not limited thereto. Moreover, each of them may be used singly or two or more thereof may be used in combination.

The addition reaction of the crosslinking agent of the invention to these monomers is usually a solution reaction using an alkaline catalyst or a non-solvent reaction. As the alkaline catalyst, an alkali metal hydroxide such as sodium hydroxide or potassium hydroxide, an alkaline earth metal hydroxide such as calcium hydroxide, an amine compound such as ammonia, methylamine, or dimethylamine, or the like is suitable.

The amount of the alkaline catalyst to be used may be an amount so that pH of the reaction system becomes in the range of usually 8 to 12, further 9 to 11. In the case where the amount of the alkaline catalyst to be used is small and the pH is low, the reaction takes a long period of time, so that the case tens to be not economically efficient. When the amount is increased to elevate the pH, the reaction rate is accelerated in proportion to the pH, but when the pH exceeds 12, the reaction rate becomes constant or tends to decrease.

Moreover, as the solvent for use in the addition reaction, there may be mentioned alcoholic solvents such as methanol, ethanol, and propanol, ketone-based solvents such as acetone, methyl ethyl ketone, methyl isopropyl ketone, and methyl isobutyl ketone, or water. Particularly, in the case where the resulting addition product, i.e., the crosslinkable monomer is used in a solid form, a method of performing the reaction in an aqueous solution and taking out a precipitated reaction product is preferably used. Moreover, in the case where the resulting crosslinkable monomer is applied or impregnated as a solvent solution onto various base materials, it is preferable to use an alcoholic solvent or a ketone-based solvent.

The amount of the crosslinking agent of the invention relative to each monomer varies depending on the kind of the monomer but it is essential that the molar ratio exceeds 2 times in order to obtain the crosslinked polymer. An upper limit is a maximum addition amount of the aldehyde compound to each monomer and the reaction is usually performed at around the upper limit. For example, the molar ratio is 2 to 3 times in the case where phenols are used, the molar ratio is 2 to 4 times in the case of ureas, and the molar ratio is 2 to 6 times in the case of melamines.

In this regard, the reaction temperature of the addition reaction is not particularly limited and the reaction may be performed within the range of room temperature to the boiling point of the solvent used. However, when the reaction is performed at excessively high temperature, there is a possibility that not only the addition reaction but also the crosslinking reaction occur, so that the case is not preferable. Similarly, in the case of a solution reaction, it is not preferable to perform the reaction at excessively high concentration.

By the aforementioned addition reaction, a crosslinkable monomer wherein multiple crosslinking agents of the invention are added to one monomer used as a raw material is obtained but is usually a mixture of the monomers having different addition amount. The structure varies depending on the monomer used as a raw material. In the case where phenol is used, the addition reaction occurs at an o-position and p-position of the hydroxyl group and, for example, a compound represented by the following formula (A) is obtained.

In this regard, X in the formula represents a metal element or an alkyl group having 1 to 10 carbon atoms.

[Chem. 8]

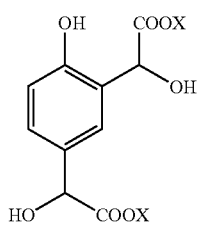

Formula (A)

In the thus obtained crosslinkable monomer, the hydroxyl groups first undergo dehydrative condensation by heating to form an ether bond and further one molecule of OHC—COOX is eliminated to form a methylene bond, thereby a crosslinked polymer having a strong crosslinked structure being fabricated. In the following formula (B), a part of a structural example of the crosslinked polymer is shown in the case where phenol is used as a monomer.

In this regard, X in the formula represents a metal element or an alkyl group having 1 to 10 carbon atoms.

[Chem. 9]

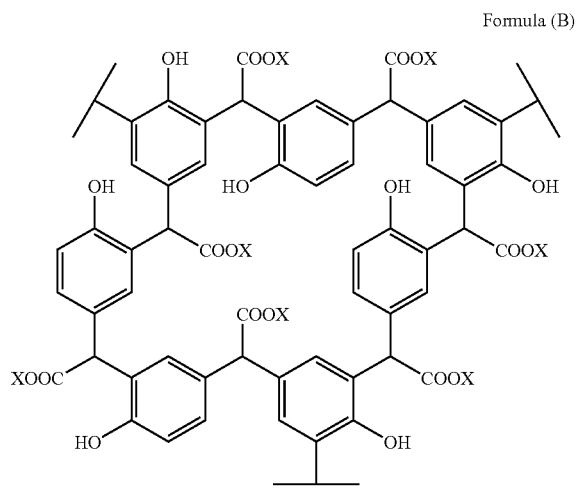

Formula (B)

The thus obtained crosslinked polymer is excellent in strength and heat resistance. The crosslinkable monomer using phenols as a raw material is generally referred to as a resol type phenol resin and may be used as various adhesives and binders for plywood and the like. A laminate obtained by laminating paper or cloth which has been impregnated with the resin and dried and thermally crosslinking the laminated product can be used for printed wiring boards and the like. Moreover, the crosslinked polymer obtained using ureas as a monomer can be used, for example, as various fabricated articles such as daily necessities. The crosslinkable monomer obtained using melamines as a monomer can be used as a component for paints and adhesives and the crosslinked polymer obtained by crosslinking the crosslinkable monomer can be used as fabricated articles such as eating utensils and decorative laminates.

In the above, the crosslinkable monomer having a crosslinkable functional group obtained by adding the crosslinking agent of the invention to a monomer such as ureas, melamines, or phenols under alkaline conditions and the crosslinked polymer are described. However, when the aldehyde compound is reacted with phenols under acidic conditions, a condensation reaction occurs simultaneously with methylol group fabrication through aldehyde addition to the phenol nucleus and a polynuclear compound (usually, a compound containing six or less nuclei) having no crosslinkable functional group is obtained, which is usually called a novolak type phenol resin.

As the aldehyde compound for obtaining the novolak type phenol resin, it is possible to use the crosslinking agent of the invention and the novolak type phenol resin obtained thereby is, for example, one having a structure shown below.

In this regard, X in the formula represents a metal element or an alkyl group having 1 to 10 carbon atoms.

[Chem. 10]

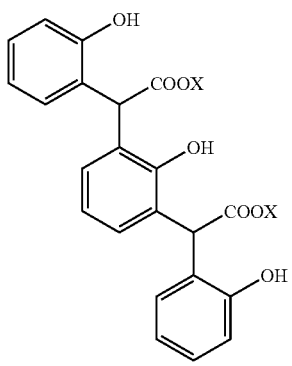

As the phenols to be a raw material for the novolak type phenol resin, various phenols can be used in the same manner as in the case of the aforementioned resol type phenol resin.

As a process for producing the novolak type phenol resin, a known process can be used but, in general, the resin is obtained by reacting phenols with an aldehyde compound which is the crosslinking agent of the invention usually at a temperature of 50° C. to reflux temperature for 1 to 50 hours in the presence of an acidic catalyst, e.g., an inorganic acid such as sulfuric acid, hydrochloric acid, or nitric acid, a phosphoric acid such as metaphosphoric acid, pyrophosphoric acid, or orthophosphoric acid, an organophosphoric acid such as ethylenediaminetetrakismethylenephosphonic acid, aminotrismethylenephosphonic acid, 1-hydroxyethylidene-1,1'-diphosphonic acid, or 2-phosphonobutane-1,2,4-tricarboxylic acid, an organic acid such as p-toluenesulfonic acid, xylenesulfonic acid, or oxalic acid.

The amount of the crosslinking agent of the invention relative to the phenols to be used at the production of the novolak type phenol resin is usually about 0.3 to 1 mol based on 1 mol of the phenols. When the amount is too small, the resin is not sufficiently crosslinked. On the contrary, when the amount is too large, the crosslinking reaction excessively proceeds and the molecular weight becomes too large, so that subsequent handling tends to be difficult.

In the thus obtained novolak type phenol resin using the crosslinking agent of the invention, the crosslinking reaction further proceeds by heating after an aldehyde compound, desirably the crosslinking agent of the invention is further added together with an alkaline catalyst such as ammonia, an alkali metal hydroxide, or an alkaline earth metal hydroxide, thereby a crosslinked polymer having a structure similar to that represented by the formula (B) being obtained.

As uses thereof, the resin can be similarly used so far as the uses are those where a usual novolak type phenol resin is used. For example, the resin is mixed with wood flour or a filler such as glass fiber or calcium carbonate, is filled into a prescribed mold by injection molding, extrusion molding, or press molding, and then is thermally cured to obtain a molded article excellent in heat resistance, solvent resistance, strength, and the like, which can be used as electronic parts, cases of various instruments, and the like.

Furthermore, the thus obtained novolak type phenol resin using the crosslinking agent of the invention can be utilized as an epoxy resin by reacting the phenolic hydroxyl group with an epihalohydrin to introduce a glycidyl group.

The following shows a representative structure of the epoxy resin comprising the novolak type phenol resin using the crosslinking agent of the invention.

In this regard, X in the formula represents a metal element or an alkyl group having 1 to 10 carbon atoms.

[Chem. 11]

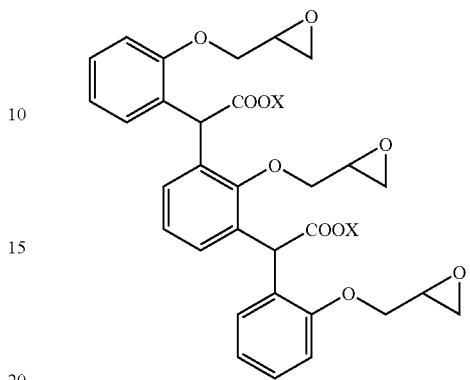

The epoxy resin can be obtained by adding at once or gradually 2 to 20 mol of an epihalohydrin such as epichlorohydrin, epibromohydrin, or β-methylepichlorohydrin relative to 1 mol of the phenolic hydroxyl group in the novolak type phenol resin and reacting it at a temperature of 10 to 200° C. for 0.5 to 10 hours with adding 0.9 to 2 mol % of a basic catalyst relative to 1 mol of the phenolic hydroxyl group as a catalyst.

As the basic catalyst for use in such a reaction, there may be, specifically, mentioned alkaline earth metal hydroxides, alkali metal hydroxides, alkali metal carbonate, and the like. Preferably, sodium hydroxide or potassium hydroxide is used.

Moreover, it is possible to perform the reaction without solvent but it is preferable to perform a solution reaction using ketones such as acetone or methyl ethyl ketone, alcohols such as methanol, ethanol, isopropyl alcohol, n-propyl alcohol, or n-butanol, cellosolves such as methyl cellosolve or ethyl cellosolve, ethers such as tetrahydrofuran, 1,4-dioxane, 1,3-dioxane, or diethoxyethane, an aprotic organic solvent such as acetonitrile, dimethyl sulfoxide, or dimethylformamide as a solvent. In this regard, the solvents may be used singly or two or more solvents may be used in combination in order to adjust polarity.

The thus obtained epoxy resin derived from the novolak type phenol resin using the crosslinking agent of the invention can be converted into a crosslinked polymer by mixing a curing agent such as an amine compound and, if necessary, by heating and it is possible to apply the polymer to uses where usual epoxy resins are used.

[Crosslinked Polymer (Crosslinked Product of Linear Polymer)]

The following will describe the crosslinked polymer obtained by intermolecular crosslinking of a linear polymer with the crosslinking agent of the invention.

The linear polymer for use in the crosslinked polymer is not particularly limited so long as it has a functional group capable of reacting with an aldehyde group. As such a functional group, there may be mentioned an acetoacetyl group, a carboxyl group, a silicon group, a sulfonic acid group, a cationic group, an ethylene group, an acrylamide group, an amide group, and the like. Of these, the acetoacetyl group is the most preferable functional group from the viewpoint of excellent reactivity with the crosslinking agent of the invention.

Moreover, the polymer having the aforementioned functional group in the side chain is not particularly limited so long as it is a linear polymer and there may be mentioned polyolefin-based resins such as polyethylene and polypropylene, polyester-based resins such as polyethylene terephthalate, polybutylene terephthalate, and polyethylene naphthalate, polyamide-based resins such as Nylon 6, Nylon 11, Nylon 12, and Nylon 66, polyvinylic resins such as polyvinyl chloride, polyvinyl acetate, polyvinyl alcohol, polyacrylic acid, and polymethyl methacrylate, polydiolefin-based resins such as polybutadiene and polyisoprene, polyether-based resins such as polyacetal and polyethylene oxide, polyurethane-based resins, polycarbonate-based resins, polyimide-based resins, formaldehyde-based resins, polyol-based resins, and the like. In this regard, these linear polymers may be straight chain ones or branched chain ones.

In this regard, the acetoacetyl group or the aforementioned functional group capable of reacting with an aldehyde group may be introduced into the aforementioned polymer by either method of copolymerization or a post-reaction.

As a monomer for use in the case of introducing the acetoacetyl group into the side chain by copolymerization, there may be, for example, mentioned vinyl acetoacetate and acetoacetoxyalkyl (meth)acrylate, and particularly, acetoacetoxymethyl (meth)acrylate is preferably used.

The acetoacetoxyalkyl (meth)acrylate is widely used in the case where the acetoacetyl group is introduced into vinyl acetate-based resins, acrylic resins, and styrene-based resins. For example, by emulsion polymerization of the monomer having the acetoacetyl group with various monomers, an aqueous emulsion of a copolymer having these components is obtained. Specifically, an aqueous emulsion disclosed in JP-A-2001-342219 and the like may be mentioned.

By applying the crosslinking agent of the invention to the aqueous emulsion containing the polymer having the acetoacetyl group as a dispersoid, it is possible to impart an excellent water resistance to a dry film obtained from the emulsion.

With regard to the amount of the crosslinking agent of the invention to be blended relative to the aqueous emulsion, the crosslinking agent is preferably used in the range of usually 0.01 to 100 parts by weight, particularly 0.1 to 50 parts by weight, further 0.5 to 10 parts by weight based on 100 parts by weight of the solid matter of the aqueous emulsion. Moreover, with regard to the molar ratio (Y/X) between the total amount (X) of the aldehyde group or the hemiacetal group and acetal group in the crosslinking agent, and the amount (Y) of the acetoacetyl group in the polymer having the acetoacetyl group in the aqueous emulsion, usually, the range of 0.01 to 20, preferably 0.05 to 10, particularly 0.1 to 5 is preferably used. When the amount of the crosslinking agent to be blended or the amount of the aldehyde group or the total amount of the hemiacetal group and the acetal group in the crosslinking agent is too small, there is a tendency that the crosslinking takes a long period of time or the solvent resistance of the obtained crosslinked polymer becomes insufficient. On the contrary, when the amount is too large, the aqueous emulsion after blending of the crosslinking agent is apt to be thickened depending on its use environment, so that its pot life tends to be shortened.

The reaction of the acetoacetyl group with the crosslinking agent of the invention occurs through nucleophilic attack of the active methylene sandwiched between two carbonyl groups in the acetoacetyl group to the aldehyde carbon in the glyoxylate and the crosslinked structure part is presumed to be one represented by the following structural formula.

In this regard, X in the formula represents a metal element or an alkyl group having 1 to 10 carbon atoms.

In the following formula, a case where X is an alkyl group or a monovalent metal such as an alkali metal is exemplified but, in the case where X is a multivalent metal such as an alkaline earth metal, there is a case where the metal is shared with other crosslinked structure part or free glyoxylic acid.

[Chem. 12]

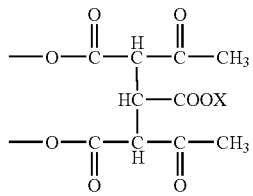

Moreover, the aforementioned linear polymers all can improve heat resistance and solvent resistance by conversion into crosslinked polymers. Particularly, in the case of a PVA-based resin, the resin is intrinsically water-soluble but water resistance can be imparted thereto by a post-reaction with the crosslinking agent to convert the resin into a crosslinked polymer, so that the effect of crosslinking is extremely evident. Furthermore, since the crosslinking agent of the invention has an ionic group (carboxylate) in the molecule, the agent is excellent in affinity with the PVA-based resins and the acetoacetyl group and, as a result, a crosslinked structure having a little unevenness in crosslinking density and a high homogeneity is obtained.

Therefore, it is considered that the crosslinking agent of the invention can most strongly exhibit the ability by combining it with the AA-PVA-based resin.

The following will describe the AA-PVA-based resin and its crosslinked polymer in detail.

[AA-PVA-Based Resin and its Crosslinked Polymer]

The AA-PVA-based resin for use in the invention is a PVA-based resin having an acetoacetyl group in the side chain.

The process for producing the AA-PVA-based resin is not particularly limited but there may be, for example, mentioned a method of reacting a PVA-based resin with diketene, a method of ester-exchange by reacting a PVA-based resin with an acetoacetic acid ester, a method of saponification of a copolymer of vinyl acetate with vinyl acetoacetate, and the like. However, since the production process is simple and an AA-PVA-based resin having a good quality is obtained, it is preferable to produce the resin by the method of reacting a PVA-based resin with diketene. The following will describe such a method.

As the PVA-based resin to be a raw material, generally, a saponification product or its derivative of a polymer of a vinyl ester-based monomer is used. As the vinyl ester-based monomer, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like but vinyl acetate is preferably used in view of economical efficiency.

Moreover, a saponification product of a copolymer of a vinyl ester-based monomer with a monomer copolymerizable with the vinyl ester-based monomer or the like can be used. Examples of the copolymerization monomer include olefins such as ethylene, propylene, isobutylene, α-octene, α-dodecene, and α-octadecene; hydroxyl group-containing α-olefins such as 3-buten-1-ol, 4-penten-1-ol, 5-hexen-1-ol, and 3,4-dihydroxy-1-butene and derivatives thereof such as acylated products; unsaturated acids such as acrylic acid, methacrylic acid, crotonic acid, maleic acid, maleic anhydride, itaconic acid, and undecylenic acid, and salts, monoesters, or dialkyl esters thereof; nitriles such as acrylonitrile and methacrylonitrile; amides such as diacetoneacrylamide, acrylamide, and methacrylamide; olefinsulfonic acids such as ethylenesulfonic acid, allylsulfonic acid, and methallylsulfonic acid or salts thereof; vinyl compounds such as alkyl vinyl ethers, dimethylallyl vinyl ketone, N-vinylpyrrolidone, vinyl chloride, vinylethylene carbonate, 2,2-dialkyl-4-vinyl-1,3-dioxolane, and glycerin monoallyl ether; substituted vinyl acetates such as isopropenyl acetate and 1-methoxyvinyl acetate; vinylidene chloride, 1,4-diacetoxy-2-butene, 1,4-dihydroxy-2-butene, vinylene carbonate, and the like.

Furthermore, there may be also mentioned polyoxyalkylene group-containing monomers such as polyoxyethylene (meth)allyl ether, polyoxyethylene(meth)acrylamide, polyoxypropylene(meth)acrylamide, polyoxyethylene (meth) acrylate, polyoxypropylene (meth)acrylate, polyoxyethylene (1-(meth)acrylamide-1,1-dimethylpropyl) ester, polyoxyethylene vinyl ether, polyoxypropylene vinyl ether, polyoxyethyleneallylamine, polyoxypropyleneallylamine, polyoxyethylenevinylamine, and polyoxypropylenevinylamine; cationic group-containing monomers such as N-acrylamidemethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride; and the like.

In this regard, the amount of the copolymerization monomer to be introduced is not categorically determined since it varies depending on the kind of the monomer but the amount is usually 10% by mol or less, particularly 5% by mol or less based on the total structural units. When the amount is too large, compatibility with the crosslinking agent sometimes decrease, so that the case is not preferable.

Moreover, by controlling the polymerization temperature to 100° C. or higher, it is possible to use one wherein a 1,2-diol bond is introduced into the PVA main chain in a ratio of about 1.6 to 3.5% by mol.

For the introduction of the acetoacetyl group by the reaction of diketene with the PVA-based resin obtained by saponifying the polymer and copolymer of the vinyl ester-based monomer, the PVA-based resin and gaseous or liquid diketene may be directly reacted or a method of adsorbing and occluding an organic acid into the PVA-based resin beforehand and spraying and reacting gaseous or liquid diketene under an inert gas atmosphere, a method of spraying an organic acid and liquid diketene onto the PVA-based resin and reacting them, or the like is employed.

As a reaction apparatus at the implementation of the above-mentioned reaction, an apparatus capable of heating and fitted with a stirrer is sufficient. For example, a kneader, a Henschel mixer, a ribbon blender, any of other various blenders, a stirring and drying apparatus may be used.

The average degree of polymerization of the thus obtained AA-PVA-based resin may be suitably selected depending on uses thereof but is usually 300 to 4,000, and one having the degree of particularly 400 to 3,500, further 500 to 3,000 is suitably used. When the average degree of polymerization is too small, there is a tendency that a sufficient water resistance is not obtained or a sufficient crosslinking rate is not obtained. On the contrary, when it is too large, in the case of using the resin as an aqueous solution, its application to various steps tends to be difficult, for example, the viscosity becomes too high and thus coating on a base material becomes difficult.

Moreover, the degree of saponification of the AA-PVA-based resin for use in the invention is usually 80% by mol or more, and one having the degree of further 85% by mol or more, particularly 90% by mol or more is suitably used. In the case where the degree of saponification is low, there is a tendency that it becomes difficult to make the resin into an aqueous solution, stability of the aqueous solution decreases, or water resistance of the resulting crosslinked polymer becomes insufficient. In this regard, the average degree of polymerization and the degree of saponification are measured in accordance with JIS K6726.

Furthermore, a content of the acetoacetyl group (hereinafter abbreviated as degree of AA) in the AA-PVA-based resin is usually 0.1 to 20% by mol, and one having the content of further 0.2 to 15% by mol, particularly 0.3 to 10% by mol is commonly widely used. When the content is too small, there is a tendency that a sufficient water resistance is not adequately obtained or a sufficient crosslinking rate is not obtained. On the contrary, when the content is too large, there is a tendency that the water solubility decreases or the stability of the aqueous solution decreases.

In the invention, as the AA-PVA-based resin, one having a hydroxyl group average chain length of 10 or more is usually used and one having the chain length of 15 or more is suitably used. When the hydroxyl group average chain length is too short, there is a tendency that the water resistance of the resulting crosslinked reaction product decreases.

In this regard, the "hydroxyl group average chain length" [l(OH)] is determined from an absorption strength ratio of absorption based on methylene carbon parts observed in the range of 38 to 46 ppm in $^{13}$C-NMR measurement (solvent: $D_2O$) using 3-(trimethylsilyl)propionic-2,2,3,3-$d_4$-acid sodium salt (3-(trimethylsilyl)propionic-2,2,3,3-$d_4$-acid sodium salt) as an internal standard [absorption of (OH, OH)dyad=absorption having a peak top in the range of 43 to 46 ppm, absorption of (OH, OR)dyad=absorption having a peak top in the range of 41 to 43 ppm, absorption of (OR, OR)dyad=absorption having a peak top in the range of 38 to 41 ppm] and is a value calculated according to the following equation:

$$l(OH)=\{2(OH,OH)+(OH,OR)\}/(OH,OR)$$

wherein each absorption strength ratio of (OH, OR) or (OH, OH) is calculated as molar fraction.

The hydroxyl group average chain length and a measurement method thereof are detailed in "POVAL" (publisher: Koubunshi Kankoukai, 248 pages, 1981) and Macromolecules, Vol. 10, p 532 (1977).

The method for controlling the hydroxyl group average chain length of the AA-PVA-based resin is not particularly limited but it is preferable to perform alkali-saponification in the presence of a solvent having an dielectric constant of 32 or less at 20° C. in a saponification step of polyvinyl acetate or the like at the production of the PVA-based resin to be used as a raw material. Usually, the alkali-saponification is performed at a dielectric constant of 6 to 28 and is preferably performed at a dielectric constant of 12 to 25. When the dielectric constant is too high, there is a tendency that a property of blocking the sequence of the remaining acetic acid group in the PVA-based resin decreases and thus the hydroxyl group average chain length of the resulting AA-PVA-based resin is shortened.

As the solvent having an dielectric constant of 32 or less at 20° C., there may be mentioned methanol (31.2), methyl acetate/methanol=1/3 (27.1), methyl acetate/methanol=1/1 (21.0), methyl acetate/methanol=3/1 (13.9), methyl acetate (7.03), isopropyl acetate (6.3), trichloroethylene (3.42), xylene (2.37), toluene (2.38), benzene (2.28), acetone (21.4), and the like. Of these, a mixed solvent of methyl acetate/methanol is preferably used.

In order to control a degree of swelling and an elution ratio of the PVA-based resin as a raw material, there may be mentioned a method of subjecting the PVA-based resin as a raw material to a heating treatment on standing or under flowing to control the degree of crystallization or the like but the method of the heating treatment under flowing is preferable in view of controlling a volatile matter content.

In the invention, all the PVA-based resins are preferably AA-PVA-based resins but a PVA-based resin other than the AA-PVA-based resin may be used in combination. The content thereof is usually 20% by weight or less and is particularly preferably 10% by weight.

As examples of the various PVA-based resins other than the AA-PVA-based resin, saponification products of copolymers of vinyl ester-based monomers with various monomers copolymerizable with the vinyl ester-based monomers and the like can be used. Examples of the various copolymerization monomers include olefins such as ethylene, propylene, isobutylene, α-octene, α-dodecene, and α-octadecene; hydroxyl group-containing α-olefins such as 3-buten-1-ol, 4-penten-1-ol, 5-hexen-1-ol, and 3,4-dihydroxy-1-butene and derivatives such as acylated products thereof; unsaturated acids such as acrylic acid, methacrylic acid, crotonic acid, maleic acid, maleic anhydride, itaconic acid, and undecylenic acid, and salts, monoesters, or dialkyl esters thereof; nitriles such as acrylonitrile and methacrylonitrile; amides such as diacetoneacrylamide, acrylamide, and methacrylamide; olefinsulfonic acids such as ethylenesulfonic acid, allylsulfonic acid, and methallylsulfonic acid or salts thereof; vinyl compounds such as alkyl vinyl ethers, dimethylallyl vinyl ketone, N-vinylpyrrolidone, vinyl chloride, vinylethylene carbonate, 2,2-dialkyl-4-vinyl-1,3-dioxolane, and glycerin monoallyl ether; substituted vinyl acetates such as isopropenyl acetate and 1-methoxyvinyl acetate; vinylidene chloride, 1,4-diacetoxy-2-butene, 1,4-dihydroxy-2-butene, vinylene carbonate, and the like.

Moreover, in the AA-PVA-based resin of the invention, an acetic acid salt of an alkali metal, such as sodium acetate (mainly derived from a reaction product formed by saponification of polyvinyl acetate with an alkali metal hydroxide used as a saponification catalyst or the like), an organic acid such as acetic acid (derived from an organic acid occluded into PVA at the time of the reaction with diketene at the introduction of the acetoacetic acid ester group into the PVA-based resin), an organic solvent such as methanol or methyl acetate (derived from the reaction solvent for the PVA-based resin, the washing solvent at the production of the AA-PVA-based resin, and the like) may partially remain.

The crosslinked polymer obtained by crosslinking the thus obtained AA-PVA-based resin with the crosslinking agent of the invention is obtained by reacting the AA-PVA-based resin with glyoxylate, the glyoxylic acid ester derivative represented by the general formula (1), or the like. In the crosslinking reaction, the mixing ratio of the AA-PVA-based resin to the crosslinking agent containing the glyoxylate as a main component is not particularly limited but usually, the crosslinking agent is suitably used in the range of 0.1 to 200 parts by weight, further 0.5 to 100 parts by weight, particularly 1 to 50 parts by weight based on 100 parts by weight of the AA-PVA-based resin. Moreover, the molar ratio (Y/X) between the total amount (X) of the aldehyde group or the hemiacetal group and acetal group in the crosslinking agent, and the total amount (Y) of the AA group in the AA-PVA-based resin is in the range of usually 0.01 to 50, preferably 0.05 to 20, particularly 0.1 to 10. When the amount of the aldehyde group or the total amount of the hemiacetal group and the acetal group is too small, the water resistance of the obtained crosslinked polymer may become insufficient in some cases. On the contrary, when the amount is too large, the mixed aqueous solution is apt to be thickened depending on its use environment, so that its pot life may be shortened in some cases.

The crosslinked polymer obtained by crosslinking the AA-PVA-based resin with the crosslinking agent of the invention is usually made into a resin composition aqueous solution containing the AA-PVA-based resin and the crosslinking agent of the invention and then applied to various uses such as coating agent uses and paint uses. The resin composition aqueous solution can be prepared by (i) a method of adding a mixture of the AA-PVA-based resin and the crosslinking agent to water and dissolving them, (ii) a method of mixing the AA-PVA-based resin and the crosslinking agent separately dissolved beforehand, (iii) a method of adding the crosslinking agent to an aqueous solution of the AA-PVA-based resin and mixing them, or the like. Moreover, in the case where the glyoxylate is produced in the system as mentioned above and is used without isolation, it is possible to carry out the reaction in the presence of the AA-PVA-based resin. For example, in the case where the glyoxylate is obtained by neutralizing glyoxylic acid with an alkaline compound, a method of adding the alkaline compound to a mixed aqueous solution of the AA-PVA-based resin and glyoxylic acid can be also employed.

The concentration of the AA-PVA-based resin aqueous solution in the method for preparing the resin composition aqueous solution is preferably 0.05 to 40% by weight, further 1 to 30% by weight, and particularly 1 to 20% by weight. When the concentration of the AA-PVA-based resin aqueous solution is too high, the viscosity becomes too high and the coating onto the base material and the application to various steps become difficult in some cases, so that the concentration is not preferable. Moreover, when the concentration is too low, the amount of the resin is insufficient and its drying takes a long period of time, so that the concentration is not preferable.

The pH of the resin composition aqueous solution is usually 2 to 10, preferably 3 to 10, and more preferably 4 to 9. When the pH is too low, corrosion of the apparatus used for the application of the resin composition aqueous solution may be invited in some cases, so that a countermeasure thereto becomes necessary. On the contrary, when the pH is too high, the resin composition aqueous solution is apt to be thickened and thus the pot life tends to be shortened.

Moreover, into the aforementioned aqueous solution, another known crosslinking agent may be blended within the range where the characteristics of the invention are not impaired. As examples of the crosslinking agent, there may be used multivalent metal compound represented by water-soluble titanium compound, water-soluble zirconium, or water-soluble aluminum compound, boron compounds such as boric acid and borax, amine compounds (diamine compounds, polyamine compounds, polyallylamine, etc.), hydrazine compounds (example; adipoyldihydrazide), polymer hydrazide (polyaminoacrylamide manufactured by Otsuka Chemical Co., Ltd.), silane compounds, methylol group-containing compounds (methylol-melamine etc.), aldehyde group-containing compounds (glyoxal, dimethoxyethanal, glutaraldehyde, etc.), epoxy compounds, thiol compounds, isocyanate compounds, polyisocyanate compounds ("Hydran Asister C1" manufactured by Dainippon Ink And Chemicals, Incorporated, etc.), blocked isocyanate compounds (ketoxime-blocked products or phenol-blocked products, etc.), water-soluble or water-dispersible epoxy resins or compounds (polyethylene glycol diglycidyl ether, polypropylene glycol diglycidyl ether, polytetramethylene glycol diglycidyl ether, neopentyl glycol diglycidyl ether, diglycerin diglycidyl ether, ethylene glycol diglycidyl ether, propylene glycol diglycidyl ether, 1,4-butanediol diglycidyl ether, 1,6-hexanediol diglycidyl ether, bisphenol A diglycidyl ether, resorcin diglycidyl ether, bisphenol F diglycidyl ether, resorcin diglycidyl ether, glycerin triglycidyl ether, trimethylolpropane triglycidyl ether, pentaerythritol polyglycidyl ether, sorbitol polyglycidyl ether, sorbitan polyglycidyl ether, polyglycerol polyglycidyl ether, etc.), water-soluble or water-dispersible oxetane resins or compounds, polyamidoamine-epichlorohydrin resins, polyethyleneimines, and the like. They may be used singly or two or more thereof may be used in combination.

In this regard, into the aforementioned aqueous solution, additives such as antifoamers, antifungal agents, antiseptics, and leveling agents, various emulsions, polyester-based ionomer type urethane resins ("Hydran AP-20", "Hydran APX-101H" manufactured by Dainippon Ink And Chemicals, Incorporated, etc.), various polymer dispersions represented by polyurethane-based dispersions and polyester-based dispersions, water-soluble resins such as polyhydroxyethyl methacrylate, polyhydroxyethyl acrylate, and polyacrylic acid, compounds having a glycidyloxy group, metal colloids, and the like may be blended in the range where the characteristics of the invention are not inhibited.

The aqueous solution of resin composition of the invention thus prepared is applied to various uses by a known method such as coating, molding, or immersion and then is subjected to drying under heating or drying at a temperature of low temperature to normal temperature, thereby the object of making the PVA-based resin water-resistant can be achieved.

The drying conditions are not particularly limited and are suitably selected depending on the type of usage. A temperature condition of usually 5 to 150° C., further 30 to 150° C., particularly 50 to 150° C. and a drying time of 0.1 to 60 minutes, further 0.1 to 30 minutes, particularly 0.2 to 20 minutes are preferably employed.

The crosslinked polymer obtained by crosslinking the AA-PVA-based resin using the crosslinking agent of the invention is useful for various uses which require water resistance and particularly, the polymer is suitable for various adhesive uses, binder uses, coating uses, and the like.

The following will describe a polarizer using the crosslinked polymer of the AA-PVA-based resin with the crosslinking agent of the invention, a heat-sensitive recording medium, and an aqueous emulsion.

[Polarizer]

First, the polarizer of the invention will be described.

The polarizing film for use in the polarizer of the invention is not particularly limited and any known one can be employed. For example, there may be mentioned (i) one obtained by adsorbing a dichroic material such as iodine or a dichroic dye onto a vinyl alcohol-based resin film such as a PVA-based film, a partially formalized PVA-based film, or an ethylene-vinyl alcohol resin-based film and uniaxially orienting the resulting film (see e.g., JP-A-2001-296427 and JP-A-7-333426), (ii) one containing a birefringent material having liquid crystallinity together with the dichroic material in the vinyl alcohol-based resin film in (i) (see e.g., JP-A-2007-72203), (iii) one obtained by uniaxially orienting a thermoplastic norbornene-based resin film containing a dichroic material (see e.g., JP-A-2001-356213), (iv) a polyene-based film obtained by removing water or acetic acid from a PVA-based resin or an ethylene-vinyl alcohol resin to introduce a continuous polyene structure and orienting the resulting resin (see e.g., JP-A-2007-17845), and the like.

Of these, a polarizing film containing a PVA-based film and a dichroic material such as iodine is suitable. The following will describe the polarizing film containing a PVA-based film and iodine.

The PVA-based resin for use in the PVA-based film is usually produced by saponification of a polyvinyl ester obtained by polymerizing a fatty acid vinyl ester represented by vinyl acetate, but may be a copolymer in a small amount within the range where polarizing properties are not impaired and, for example, may be one obtained by saponifying a copolymer with a component copolymerizable with vinyl acetate, such as an unsaturated carboxylic acid (inclusive of a salt, ester, amide, nitrile, or the like), olefins having 20 to 30 carbon atoms (ethylene, propylene, n-butene, isobutene, or the like), vinyl ethers, or an unsaturated sulfonate. A degree of saponification of the PVA-based resin is usually 85 to 100% by mol, and one having the degree of particularly 90 to 100% by mol and further 95 to 100% by mol is preferably used. When the degree of saponification is too low, the water resistance tends to be insufficient at the polarizing film preparation.

Moreover, as an average degree of polymerization of the PVA-based resin, any one can be used. However, the degree is usually 1,200 to 7,000 and one having the degree of particularly 1,500 to 5,000, further 1,600 to 4,000 is preferably used. When the average degree of polymerization is too low, high orientation tends to become difficult at the polarizing film preparation. When the degree is too high, surface smoothness and transmittance of the film tends to decrease. In this regard, the degree of saponification and average degree of polymerization of the PVA-based resin are measured in accordance with JIS K6726.

The process for producing the polarizing film is not particularly limited and any known method may be adopted but the following will describe a representative example.

First, a raw film is fabricated from an aqueous solution of the PVA-based resin. As the method, a known film fabrication method can be used. Usually, a solution casting method is adopted but a dry or wet type film fabrication method or a gel film fabrication method can be also performed. In the case of using the solution casting method, the concentration of the PVA-based resin aqueous solution is usually 1 to 50% by weight and the raw film can be obtained by casting the aqueous solution onto a metal roll or the like and drying under heating.

To the PVA-based resin aqueous solution, it is also possible to add various additives within the range where the quality of the polarizer is not impaired. For example, depending on the purpose of adjusting affinity to the base material and volatility, it is also a preferable embodiment to blend any of various solvents singly or as a mixture. As the solvents, there may be mentioned monohydric alcohols such as methyl alcohol, ethyl alcohol, n-propyl alcohol, isopropyl alcohol, and butyl alcohol; polyhydric alcohols such as ethylene glycol, diethylene glycol, triethylene glycol, tetraethylene glycol, propylene glycol, glycerin, and trimethylolpropane; phenols such as phenol and cresol; amines such as ethylenediamine and trimethylenediamine; dimethyl sulfoxide, dimethylacetamide, N-methylpyrrolidone, and the like.

The thickness of the raw film is usually 30 to 100 µm, preferably 50 to 90 µm. In the case where the thickness is too small, the orientation tends to become impossible. In the case where the film is too thick, accuracy of the thickness tends to decrease.

The raw film is converted into a polarizer through steps of uniaxial orientation, adsorption of a dichroic material such as iodine or a dichroic dye, and crosslinking with a boron compound. These steps may be performed separately or simultaneously and the order of the steps is also not particularly limited. Particularly, in view of productivity, it is preferable to perform the uniaxial orientation in at least one of the step of adsorption of the dichroic material and the step of treatment with the boron compound.

Moreover, in the production process of the polarizer, for the purpose of improving optical properties, an ozone-treating step where the PVA raw film is immersed in a treatment liquid containing ozone. The ozone-treating step can be provided as an independent step different from the iodine adsorption step, the crosslinking step, and the orientation step or ozone may be contained in a treating solution to be used in at least any one of the iodine adsorption step, the crosslinking step and the orientation step.

The stretching magnification at the uniaxial orientation is usually 3.5 to 10 times and particularly, the range of 4.5 to 7 times is preferably selected. On this occasion, slight stretching (stretching to such an extent that shrinkage in a width direction is prevented or a larger extent) may be performed in a direction perpendicular to the above orientation direction. The temperature condition at the orientation is usually selected from the range of 40 to 130° C. In this regard, the orientation operation is not limited to only one stage and can be performed as a multi-stage one. Furthermore, the orientation can be performed at any stage of the production process individually and, even in that case, the stretching magnification may be finally set at the above range.

The adsorption of iodine onto the PVA-based oriented film is performed by bringing a liquid containing iodine into contact with the film. As the iodine solution, an aqueous solution of iodine-potassium iodide is usually used. In that case, it is suitable that the concentration of iodine is 0.1 to 2 g/L, the concentration of potassium iodide is 10 to 50 g/L, and the weight ratio of potassium iodide/iodine is suitably 20 to 100. Moreover, the time for bringing the PVA-based oriented film into contact with the dichroic material solution is practically 3 to 500 seconds and the temperature of the bath is preferably 30 to 80° C. In this regard, as the contact means, any means such as immersion, application, or spraying can be applied.

The PVA-based oriented film onto which iodine has been adsorbed is then subjected to the crosslinking treatment with a boron compound. As the boron compound, boric acid or borax is used as a representative. The crosslinking treatment is performed by bringing the film obtained as mentioned above into contact with an aqueous solution or water-organic solvent mixed solution of the boron compound. The method for the contact is representatively an immersion method but it is also possible to perform the contact by an application method or a spraying method. In this regard, in the case of the immersion method, the concentration is usually selected from the range of 0.5 to 2 mol/L, and it is preferable that the temperature of the bath is usually about 50 to 70° C. and the treatment time is usually 5 to 20 minutes.

The thus obtained polarizing film containing the PVA-based resin and iodine is then laminated to a protective film through an adhesive layer. The thickness of the protective film is usually 10 to 100 µm, and preferably 20 to 80 µm. The material thereof is not particularly limited and is preferably transparent and excellent in durability. Any known one can be used and examples thereof include cellulose ester-based resin films, cyclic olefin-based resin films, (meth)acrylic resin films, α-olefin-based resin films, and the like as preferable ones.

As cellulose ester-based resins for use in the cellulose ester-based resin films, triacetyl cellulose and diacetyl cellulose are mentioned as representatives. As others, lower fatty acid esters of cellulose and mixed fatty acid esters such as cellulose acetate propionate and cellulose acetate butyrate can be used. In this regard, the cellulose ester-based resin films are subjected to a saponification treatment with an alkali aqueous solution in order to enhance affinity to the PVA-based resin for use as a polarizing film or an adhesive thereof, without limitation thereto. Moreover, one wherein an antistatic agent is applied on the surface or contained in the film is also preferably used.

As a representative cyclic olefin-based resin for use in the aforementioned cyclic olefin-based resin film, a norbornene-based resin may be mentioned. Examples of the norbornene-based resin include ring-opened (co)polymers of norbornene-based monomers, resins obtained by addition polymerization of norbornene monomers, resins obtained by addition copolymerization of norbornene-based monomers with an olefin-based monomer such as ethylene or an α-olefin, and the like. Specific examples of the norbornene-based monomers include dimers such as norbornene and norbornadiene; tricyclic compounds such as dicyclopentadiene and dihydroxypentadiene; heptacyclic compounds such as tetracyclopentadiene; substituted compounds thereof with alkyl such as methyl, ethyl, propyl, or butyl, alkenyl such as vinyl, alkylidene such as ethylidene, aryl such as phenyl, tolyl, or naphthyl, or the like; substituted compounds thereof having a group containing an element other than carbon and hydrogen, such as an ester group, an ether group, a cyano group, halogen, an alkoxycarbonyl group, a pyridyl group, a hydroxyl group, a carboxylic acid group, an amino group, an acid anhydride group, a silyl group, an epoxy group, an acryloyl group, or a methacryloyl group; and the like.

As commercially available products of the cyclic olefin-based resin film, there may be mentioned "ARTON" manufactured by JSR Corporation, "ZEONOR", "ZEONEX" manufactured by ZEON Corporation, "OPTOREZ" manufactured by Hitachi Chemical Co., Ltd., "APEL" manufactured by Mitsui Chemicals Inc., "Escena", "SCA40" manufactured by Sekisui Chemical Co., Ltd., and the like.

Moreover, as (meth)acrylic resins for use in the aforementioned (meth)acrylic resin films, there may be mentioned poly(meth)acrylic acid esters such as polymethyl methacrylate, methyl methacrylate-(meth)acrylic acid copolymers, methyl methacrylate-(meth)acrylic acid ester copolymers, methyl methacrylate-acrylic acid ester-(meth)acrylic acid copolymers, methyl (meth)acrylate-styrene copolymers, polymers having an alicyclic hydrocarbon group (e.g., methyl methacrylate-cyclohexyl (meth)acrylate copolymers, methyl methacrylate-norbornyl (meth)acrylate copolymers, etc.), high Tg (meth)acrylic resins obtained by intramolecular crosslinking or intramolecular cyclic reaction, rubber-acrylic graft type core-shell polymers, and the like.

As commercially available products of the (meth)acrylic resin film, there may be mentioned "Acrypet VRL20A", "Acrypet IRD-70 manufactured by Mitsubishi Rayon Co., Ltd., "MUX-60" manufactured by UMGABS, and the like.

Moreover, α-olefin-based resins for use in the aforementioned α-olefin-based resin films are α-olefin-based resins mainly containing a unit of 4-methylpentene-1 and include not only a homopolymer of 4-methylpentene-1 but also copolymers of 4-methylpentene-1 as a main constitutional unit with other monomer(s) copolymerizable therewith. The other monomer(s) copolymerizable with 4-methylpentene-1 include α-olefins including ethylene, cyclic olefins, and the like. As the α-olefins, there may be mentioned 1-alkenes having 2 to 20 carbon atoms (e.g., octene, decene, dodecene, octadecene, etc.), α-olefins having 8 to 18 carbon atoms, and the like. Moreover, as the cyclic olefins, there may be, for example, mentioned bicyclo[2.2.1]hept-2-ene (common name norbornene) and derivatives thereof, and the like.

In this regard, other than these protective films, there may be mentioned polyester-based resin films such as polyethylene terephthalate and polyethylene naphthalate, polystyrene-based resin films such as polystyrene and acrylonitrile-styrene copolymers, polyolefin-based resin films such as polypropylene, polyarylate-based resin films, water-soluble polyether sulfone-based resin films, polycarbonate-based resin films, vinyl chloride-based resin films, amide-based resin films such as Nylon and aromatic polyamides, (fluorine-containing) polyimide-based resin films, polyether ether ketone-based resin films, polyphenylene sulfide-based resin films, vinyl alcohol-based resin films, vinylidene chloride-based resin films, polyvinyl acetal-based resin films such as polyvinyl butyral, polyarylate-based resin films, polyoxymethylene-based resin films, epoxy resin-based films, and the like. Moreover, as the protective films, for example, cured layers of thermosetting or UV curable resins of acrylic, urethane-based, acrylurethane-based, epoxy-based, fluorine resin-based films such as tetrafluoroethylene/hexafluoropropylene copolymers, silicone-based, and the like, a polymer film described in JP-A-2001-343529 (specifically, a resin film containing an alternating copolymer comprising isobutylene and N-methylmaleimide and an acrylonitrile-styrene copolymer), and the like can be also used.

These protective films include those wherein an optically functional layer is provided thereon by applying a polymer such as a liquid crystalline polymer or a polyamide, an organic modified clay composite, or the like and subsequently curing them or a prescribed birefringence property is imparted by an operation such as uniaxial or biaxial orientation (so-called A plate, C plate, X plate, n-TAC, B-TAC, F-TAC etc.) and those wherein various adhesion enhancement layers are provided. The stretching magnification in the case where the film is oriented uniaxially or biaxially is usually about 1.1 to 5 times, preferably 1.1 to 3 times.

Furthermore, it is possible to fabricate a cured coating layer on the surface of these protective films to lower the moisture permeability to a level of 400 g/m²·24 hr or less as a value measured at a temperature of 40° C., and protect the inner polyvinyl alcohol-based polarizing film from condensed water and for suppressing occurrence of minute stripe-shaped defects that are apt to occur at end parts of a polarizer owing to environmental change.

The cured coating layer is the layer obtained by coating a solution comprising a curable resin material and subsequent curing of it by heat or irradiation with an active energy ray. The material of the cured coating layer is not particularly limited and there may be adopted curable resin materials such as silicone-based, acrylic, and urethane acrylate-based ones or those obtained by mixing a filler into the resins. Of these, one wherein a coating layer is fabricated using an acrylic curable resin is preferable.

The acrylic curable resin is a resin containing any of various (meth)acrylic acid or its ester-based monomer such as (meth)acrylic acid, methyl (meth)acrylate, ethyl (meth)acrylate, n-propyl (meth)acrylate, i-propyl (meth)acrylate, n-butyl (meth)acrylate, t-butyl (meth)acrylate, 2-ethylhexyl (meth)acrylate, dodecyl (meth)acrylate, octadecyl (meth)acrylate, acetoacetoxyethyl (meth)acrylate, and acetoacetoxybutyl (meth)acrylate; an acrylate monomer such as glycerin triacrylate, trimethylolpropane triacrylate, pentaerythritol triacrylate, pentaerythritol tetraacrylate, dipentaerythritol tetraacryalte, dipentaerythritol pentaacrylate, or dipentaerythritol hexaacrylate; any of methacrylate monomers corresponding to them, or an oligomer containing a unit derived from them as a curable component. A cured coating layer is obtained by mixing a photopolymerization initiator into the curable component to prepare a coating solution and irradiating a coated film obtained by irradiation with light, generally an ultraviolet ray. A solvent may be mixed into the coating solution according to needs.

In this regard, as the photopolymerization initiator, various ones are commercially available and the initiator may be suitably selected from "Irgacure" series manufactured by Ciba Specialty Chemicals and "Kayacure" series manufactured by Nippon Kayaku Co., Ltd. depending on the kind of the curable component or the like.

The urethane acrylate-based curable resins are also cured by light irradiation, particularly ultraviolet ray irradiation in many cases. On the other hand, the silicone-based curable resins are cured by heat in many cases.

Therefore, the cured coating layer in the invention can be provided by applying a coating solution containing the above-described curable resin on the surface of a cellulose acetate-based film by a known method such as a spin coating method or a micro gravure coating method and then subjecting the applied coating solution to ultraviolet ray curing or heat curing. The thickness of the cured coating layer is about 1 to 30 μm, preferably from 2 to 20 μm.

Of these protective films, from the viewpoints of transparency, heat resistance, mechanical strength, durability, and the like, cellulose ester-based resin films and cyclic olefin-based resin films are preferably used. Of these, triacetyl cellulose or a norbornene-based resin is suitably used.

In this regard, in order to enhance the affinity to the PVA-based resin to be used as a polarizing film or its adhesive, it is also possible to subject the protective film to various surface treatments. As the surface treatments, other than the aforementioned saponification treatment in the cellulose ester-based resin films, there may be mentioned a method of providing on the surface of the protective film an easily adhesive layer or anchor coating layer containing a (meth)acrylic acid ester-based latex, a styrene-based latex, polyethyleneimine, a polyurethane-polyester copolymer, or any of various metal colloids or imparting hydrophilicity to the surface by a corona-discharging treatment, a reduced-pressure plasma treatment or normal-pressure plasma treatment, a reduced-pressure UV treatment, an ion assisting method (e.g., IRA method of Micro Technology Co., Ltd.), or the like, a surface treating method with a silane coupling agent, a titanium coupling agent, or the like, and the like. In this regard, it is also possible to use aforementioned various surface treating methods in combination.

Moreover, for the protective film, it is also possible to provide a hard coating layer on the surface on which a polarizing film is not laminated or to perform various treatments such as sticking prevention, reflection prevention, or antiglare thereon. Furthermore, it is also possible to laminate various optically functional films such as a retardation film or a viewing angle-enlarging film.

Examples of the optically functional films include optically-compensation films, reflective polarization separation films, films with an antiglare function, films with a surface reflection-preventing treatment, reflective films having a reflective function, translucent reflective films having both of reflective function and transmitting function, and the like. As commercially available products corresponding to the optically-compensatory films, there are "WV Film" manufactured by Fuji Photo Film Co., Ltd., "NH Film" and "NR Film" (both are trade names) manufactured by Nippon Oil Corporation, and the like. As commercially available products corresponding to the reflective polarization separation films, there are "DBEF" manufactured by Minnesota Mining and Manufacturing (3M) (Sumitomo 3M Ltd. in Japan) and the like.

The polarizer of the invention is one wherein a transparent protective film is pasted on at least one surface, preferably both surfaces of the polarizing film through an adhesive layer and wherein the adhesive layer contains a crosslinked polymer obtained by crosslinking the AA-PVA-based resin with the crosslinking agent of the invention.

The content of the crosslinked polymer in the adhesive layer is usually 50 to 100 parts by weight and the range of particularly 70 to 100 parts by weight, further 80 to 100 parts by weight is preferably used. When the content is too small, there is a tendency that adhesion strength is insufficient or the water resistance of the adhesive is insufficient.

The adhesive layer is usually fabricated by applying an aqueous adhesive containing the AA-PVA-based resin and the crosslinking agent of the invention onto the polarizing film or the protective film or both of them uniformly, and laminating them under pressure after both are pasted, followed by heating and drying.

At the coating of the aqueous adhesive on the polarizing film or the protective film, there can be employed any known methods such as a roll coater method, an air doctor use, a blade coater method, a spraying method, an immersion method, and a method of feeding an (aqueous) adhesive solution of an aqueous adhesive between the films immediately before the polarizing film and the protective film are pasted in an suitable amount, subsequently pasting both, and drying. Moreover, the coating amount of the aqueous adhesive is selected from the range of usually 1 to 1,000 nm, particularly 1 to 500 nm, further 1 to 300 nm as the thickness of the adhesive layer after drying. When the thickness is too large, there is a tendency that a uniform coating becomes difficult or unevenness in thickness occurs. Moreover, as conditions for heating and drying after application of the aqueous adhesive and pasting, the heating and drying are performed under conditions of usually 5 to 150° C., particularly 30 to 120° C., further 50 to 90° C. and 10 seconds to 60 minutes, further 30 seconds to 30 minutes, particularly 1 to 20 minutes.

The viscosity of the aqueous adhesive is usually 5 to 10,000 mPa·s, further 5 to 5,000 mPa·s, and particularly 10 to 1,000 mPa·s at 23° C. When the viscosity is too high, there is a tendency that deforming of the aqueous adhesive is not smoothly performed or uneven thickness of the adhesive layer is caused. In this regard, the viscosity of the aqueous adhesive can be measured, for example, by means of a Brookfield viscometer.

Moreover, the solid concentration by weight of the aqueous adhesive is usually 0.1 to 20%, further 0.5 to 15%, and particularly 1 to 10%. When the concentration is too low, the adhesion strength becomes insufficient. When the concentration is too high, the viscosity becomes too high and the deforming of the aqueous adhesive is not smoothly performed or uneven thickness of the adhesive layer is caused in some cases.

After a transparent protective film is pasted on at least one surface, preferably both surfaces of the polarizing film as mentioned above, a sufficient adhesive strength is obtained by performing aging for usually several hours to several days or more. A preferable temperature for the aging is 30 to 50° C. Moreover, relative humidity is in the range of about 0 to 70% RH.

[Heat-Sensitive Recording Medium]

The following will describe the heat-sensitive recording medium having a layer containing the crosslinked polymer obtained by crosslinking the AA-PVA-based resin with the crosslinking agent of the invention.

The heat-sensitive recording medium of the invention preferably contains the crosslinked polymer of the invention in the heat-sensitive coloring layer and/or a protective layer on the supporting base material.

In this regard, the supporting base material for use in the heat-sensitive recording medium of the invention is not particularly limited and paper (paper board such as manila board, white board, or liner, printing paper such as common high quality paper, medium quality paper, or gravure paper, high-, medium-, or low-grade paper, newsprint paper, release paper, carbon paper, non-carbon paper, glassine paper, synthetic paper, etc.), non-woven fabric, a plastic film (polyester film, Nylon film, polyolefin film, polyvinyl chloride film, and laminate thereof, etc.), or a composite sheet thereof such as a synthetic resin laminate paper can be employed.

The following will describe each layer of the heat-sensitive recording medium in detail.

The heat-sensitive coloring layer can be fabricated by applying an aqueous coating solution containing a leuco dye, a color developer, and a binder resin on a supporting base material. In the invention, as the binder resin, a crosslinked polymer obtained by crosslinking the AA-PVA-based resin with the crosslinking agent of the invention is used. The content of the crosslinked polymer at this time is usually 10 to 200 parts by weight based on 100 parts by weight of the total amount of the leuco dye and the color developer and the range of particularly 30 to 150 parts by weight, further 50 to 100 parts by weight is suitable.

As the above-described leuco dye, a known one can be used and examples thereof include triarylmethane-based compounds such as 3,3-bis(p-dimethylaminophenyl)-phthtalide, 3,3-bis(P-dimethylaminophenyl)-6-dimethylaminophthtalide [Crystal Violet Lactone], 3,3-bis(p-dimethylaminophenyl)phthtalide, and 3-(p-dimethylaminophenyl)-3-(1,2-dimethylindol-3-yl)phthtalide; diphenylmethane-based compounds such as 4,4'-bis(dimethylaminophenyl)benzhydryl benzyl ether and N-chlorophenylleucoauramine; xanthene-based compounds such as rhodamine B anilinolactam, rhodamine B-p-chloroanilinolactam, and 3-diethylamino-7-dibenzylaminofluoran; thiazine-based compounds such as benzoylleucomethylene blue and p-nitrobenzylilleucomethylene blue; spiro-based compounds such as 3-methylspironaphthopyran and 3-ethylspirodinaphthopyran; and the like. Moreover, these leuco dyes can be used singly or two or more thereof can be used in combination, according to needs.

Furthermore, the color developer is one which develops color through a reaction with the above described leuco dye upon heating. Examples thereof include phenol, p-methylphenol, p-tert-butylphenol, p-phenylphenol, α-naphthol, β-naphthol, 4,4'-isopropylidenediphenol [bisphenol A], 4,4'-sec-butylidenediphenol, 4,4'-cyclohexylidenediphenol, 4,4'- isopropylidenebis(2-tert-butylphenol), 4,4'-(1-methyl-n-hexylidene)diphenol, 4,4'-isopropylidenedicatechol, 4,4'-benzylidenediphenol, 4,4-isopropylidenebis(2-chlorophenol), phenyl-4-hydroxybenzoate, salicylic acid, 3-phenylsalicylic acid, 5-methylsalicylic acid, 3,5-di-tert-butylsalicylic acid, 1-oxy-2-naphthoic acid, m-hydroxybenzoic acid, 4-hydroxyphthalic acid, gallic acid, and the like. However, both of the leuco dye and the color developer are not limited thereto.

Into the heat-sensitive coloring layer, if necessary, it is also possible to add inorganic pigments such as calcium carbonate, silica, kaolin, aluminum hydroxide, aluminum oxide, zinc oxide, titanium dioxide, clay, talc, and barium sulfate; powders of organic resins such as urea-formalin resins, Nylon resins, acrylic resins, styrene-methacrylic acid copolymers, and the like; higher fatty acid metal salts such as zinc stearate and calcium stearate; lubricants such as paraffin and polyethylene wax; UV absorbents such as benzophenone-based ones and benzotriazole-based ones; anionic or nonionic surfactants; fluorescent dyes; and the like.

The coating solution for the heat-sensitive coloring layer is obtained by pulverizing the above-described leuco dye and color developer separately using a known dispersing machine such as ball mill, attritor, or sand grinder until the particle size reaches 0.5 to 3 μm to form a fine dispersion and mixing it with the crosslinking agent of the invention and the AA-PVA-based resin as a binder resin as well as, if necessary, the above-described additives, defoamer, and the like. The solid concentration of the coating solution is selected from the range of 10 to 40% by weight in consideration of workability.

At the application of the coating solution on the supporting base material, any known method such as a roll coater method, an air doctor method, a blade coater method, a bar coater method, a size press method, or a gate roll method is adopted. The coating amount of the aqueous solution is preferably 0.1 to 20/m², further 0.5 to 15 g/m², and particularly 1 to 10 g/m² as dry weight.

The following will describe the protective layer.

The protective layer is provided on the aforementioned heat-sensitive coloring layer for the purpose of improving water resistance, chemical resistance, recording and running properties, and the like. The layer is fabricated by applying, on the heat-sensitive coloring layer, a coating solution for the protective layer, which is prepared by mixing and stirring a binder resin, an inorganic pigment, and, if necessary, a lubricant and the like using water as a medium. In the invention, as the binder resin, the crosslinked polymer obtained by crosslinking the AA-PVA-based resin with the crosslinking agent of the invention is employed. The content of the crosslinked polymer at this time is suitably 10 to 200 parts by weight based on 100 parts by weight of the inorganic pigment.

Examples of the above-described inorganic pigment include inorganic pigments such as calcium carbonate, silica, zinc oxide, aluminum oxide, aluminum hydroxide, titanium dioxide, talc, kaolin, and clay and organic pigments such as Nylon resin fillers, urea-formalin resin fillers, and starch particles. Particularly, in the case where glossiness is imparted to the protective layer, inorganic ultrafine particles such as colloidal silica, gas-phase-process silica, or alumina sol are suitably used. A preferable average particle size of the inorganic fine particles is 3 to 200 nm, further 3 to 100 nm, and particularly 10 to 50 nm. When the average particle size is excessively small, writing properties and stamping properties decrease in some cases. On the contrary, when the size is too large, smoothness of the surface of the glossy layer is impaired and glossiness decreases in some cases. Therefore, these cases are not preferable.

At the application of the coating solution for the protective layer, any known means such as a roll coater method, an air doctor method, a blade coater method, a bar coater method, a size press method, or a gate roll method is applicable. The coating amount thereof is preferably about 0.5 to 10 g/m² as dry weight. After the coating, an objective coated layer is fabricated by air-drying or a light heating treatment. Moreover, it is possible that aqueous solutions containing the crosslinking agent and the AA-PVA-based resin for use in the invention are separately prepared and are laminate-coated to form a protective layer. In that case, the pigment and various auxiliaries are preferably blended into the aqueous solution of the AA-PVA-based resin. As a result, the resin composition of the invention is contained in the protective layer and the content, coating amounts, and the like may be adjusted in accordance with the above.

Moreover, at the time when the AA-PVA-based resin is contained in the protective layer and the crosslinking agent of the invention is contained in the heat-sensitive coloring layer, coating solutions each containing the AA-PVA-based resin and the crosslinking agent of the invention are separately prepared in accordance to the above and may be applied on the protective layer and the heat-sensitive coloring layer, respectively.

Furthermore, after the coating of the heat-sensitive coloring layer or after the coating of the protective layer, it is also possible to enhance smoothness and glossiness by performing a super calendering treatment.

[Aqueous Emulsion Composition]

The aqueous emulsion composition of the invention comprises an aqueous emulsion containing the AA-PVA-based resin as a dispersant and a polymer containing a repeating structural unit derived from an ethylenically unsaturated monomer as a dispersoid and the crosslinking agent of the invention blended in the aqueous emulsion. First, there will be described the polymer containing a repeating structural unit derived from an ethylenically unsaturated monomer to be used as a dispersoid.

As the ethylenically unsaturated monomer, there may be mentioned monomers to be frequently used in emulsion polymerization and representative ones include vinyl ester-based monomers, acrylic acid or its ester-based monomers, diene-based monomers, olefin-based monomers, acrylamide-based monomers, acrylonitrile-based monomers, styrene-based monomers, vinyl ether-based monomers, acrylic monomers, and the like.

There may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, 1-methoxyvinyl acetate, isopropenyl acetate, and the like as the vinyl ester-based monomers; (meth)acrylic acid, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, octadecyl (meth)acrylate, acetoacetoxyethyl (meth)acrylate, acetoacetoxybutyl (meth)acrylate, and the like as the (meth)acrylic acid or its ester-based monomers; and butadiene-1,3,2-methylbutadiene, 1,3- or 2,3-dimethylbutadiene-1,3,2-chlorobutadiene-1,3, and the like as the diene-based monomers, respectively.

Furthermore, there may be mentioned olefin-based monomers such as ethylene, propylene, 1-butene, and isobutene and halogenated olefins such as vinyl chloride, vinylidene chloride, vinyl fluoride, vinylidene fluoride as the olefin-based monomers; (meth)acrylamide, N-methylolacrylamide, N,N-dimethylacrylamide, acrylamide-2-methylpropanesulfonic acid, and diacetoneacrylamide, and the like as the acrylamide-based monomers; (meth)acrylonitrile as the acrylonitrile-based monomers; 3-isopropenyl-α,α'-dimethylbenzylacetoacetamide, styrene, α-methylstyrene, and the like as the styrene-based monomers; methyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and the like as vinyl ethers, and allyl acetate, allyl chloride, and the like as the allyl-based monomers, respectively.

Moreover, other than the above, there may be mentioned carboxyl group-containing compounds and esters thereof such as fumaric acid, maleic acid (anhydride), itaconic acid (anhydride), and trimellitic anhydride; sulfonic acid group-containing compounds such as ethylenesulfonic acid, allylsulfonic acid, methallylsulfonic acid, and 2-acrylamide-2-methylpropanesulfonic acid; vinylsilane compounds such as vinyltrimethoxysilane; and further isopropenyl acetate, 3-(meth)acrylamidopropyltrimethylammoniumu chloride, and the like.

The polymer containing a repeating structural unit derived from the aforementioned monomer may be selected depending on the intended uses and purposes of the aqueous emulsion composition and is not particularly limited. For example, in the case where the aqueous emulsion composition of the invention is used as an adhesive, a vinyl acetate-based resin is preferably used as a dispersoid thereof. Similarly, there are preferably used acrylic resins in adhesive uses, acrylic resins or acryl-styrene-based resins in paint/coating uses, acrylic resins for fiber-treating agents, acrylic resins in paper-making uses, and ethylene-vinyl acetate-based resins or acrylic resins in civil engineering uses.

Moreover, the aforementioned polymer may be a polymer containing a repeating structural unit derived from a single monomer or may be a copolymer containing repeating units derived from two or more kinds of monomers.

The following will describe a process for producing the aqueous emulsion composition of the invention.

The aqueous emulsion composition of the invention comprises an aqueous emulsion containing the AA-PVA-based resin as a dispersant and a polymer containing a repeating structural unit derived from an ethylenically unsaturated monomer as a dispersoid and the crosslinking agent of the invention blended in the aqueous emulsion. At the preparation of the aqueous emulsion, there may be mentioned (I) a method of emulsion polymerization of an ethylenically unsaturated monomer using the AA-PVA-based resin as an emulsifier or a protective colloid, (II) a method of post-emulsification of a solution or melt liquid of a polymer containing a repeating structural unit derived from an ethylenically unsaturated monomer in the presence of the AA-PVA-based resin, (III) a method of producing a more stable emulsion by adding the AA-PVA-based resin to an aqueous emulsion of a polymer containing a repeating structural unit derived from an ethylenically unsaturated monomer obtained by any method, and the like. They will be specifically described but the process is not limited to these methods.

[(I) Method by Emulsion Polymerization]

A usual emulsion polymerization method of adding an ethylenically unsaturated monomer and/or diene-based monomer or the like at one time or continuously in the presence of water, the AA-PVA-based resin, and a polymerization catalyst such as a polymerization initiator and heating and stirring them or an emulsion polymerization method of adding at one time or continuously a dispersion (pre-emulsion) obtained by mixing and dispersing an ethylenically unsaturated monomer and/or diene-based monomer or the like into an aqueous solution of the AA-PVA-based resin in the presence of water, the AA-PVA-based resin, and a polymerization catalyst and heating and stirring them may be carried out.

The amount of the AA-PVA-based resin to be used slightly varies depending on the resin content of the emulsion or the like and is preferably 0.5 to 40% by weight, further 1 to 35% by weight, particularly 3 to 30% by weight based on the whole monomers of the usual emulsion polymerization reaction system. When the amount of the AA-PVA-based resin is too small, it becomes difficult to maintain polymer particles in a stable emulsified state. On the contrary, when the amount is too large, the viscosity of the emulsion excessively increases, so that workability decreases and the water resistance of the emulsion film decreases. Thus, the cases are not preferable.

As the polymerization initiator, usually potassium persulfate, ammonium persulfate, potassium bromate, or the like may be used singly or in combination with acid sodium sulfite, and further a redox polymerization initiator such as hydrogen peroxide-tartaric acid, hydrogen peroxide-iron salt, hydrogen peroxide-ascorbic acid-iron salt, hydrogen peroxide-Rongalit, or an aqueous solution of hydrogen peroxide-Rongalit-iron salt may be used. Moreover, an oil-soluble polymerization initiator such as azobisisobutyronitrile or benzoyl peroxide can be also used.

The method of adding the polymerization initiator is not particularly limited and there can be adopted a method of initially adding all at once, a method of continuously adding them with the progress of polymerization, and the like.

In the above-described emulsion polymerization, as an emulsion dispersion stabilizer, a water-soluble polymer, a nonionic surfactant, or an anionic surfactant can be used in combination.

As the water-soluble polymer, there may be mentioned PVA such as unmodified PVA, carboxyl group-containing PVA, formalized PVA, acetalized PVA, butyralized PVA, urethanated PVA, or esterified PVA with sulfonic acid, carboxylic acid, or the like other than the AA-PVA-based resin, saponified copolymers of a vinyl ester with a monomer polymerizable therewith, and the like. As the monomer polymerizable with a vinyl ester, there may be mentioned olefins such as ethylene, butylene, isobutylene, α-octene, α-dodecene, and α-octadecene; unsaturated acids such as acrylic acid, methacrylic acid, crotonic acid, maleic acid, maleic anhydride, and itaconic acid, or salts, monoesters, or dialkyl esters thereof; nitriles such as acrylonitrile and methacrylonitrile; amides such as acrylamide, diacetoneacrylamide, and methacrylamide; olefinsulfonic acids such as ethylenesulfonic acid, allylsulfonic acid, and methallylsulfonic acid or salts thereof; alkyl vinyl ethers, vinyl ketones, N-vinylpyrrolidone, vinyl chloride, vinylidene chloride, and the like.

Moreover, as the water-soluble polymers other than the above-described PVA, there may be mentioned cellulose derivatives such as methyl cellulose, ethyl cellulose, hydroxymethyl cellulose, hydroxypropylmethyl cellulose, hydroxybutylmethyl cellulose, hydroxyethyl cellulose, carboxymethyl cellulose, aminomethylhydroxypropyl cellulose, and aminoethylhydroxypropyl cellulose, starch, tragacant, pectin, glue, alginic acid or a salt thereof, gelatin, polyvinylpyrrolidone, polyacrylic acid or a salt thereof, polymethacrylic acid or a salt thereof, polyacrylamide, polymethacrylamide, copolymers of vinyl acetate with an unsaturated acid such as maleic acid, maleic anhydride, acrylic acid, acrylic acid, methacrylic acid, itaconic acid, fumaric acid, or crotonic acid, copolymers of styrene with any of the above-described unsaturated acids, copolymers of a vinyl ether with any of the above-described unsaturated acids, and salts or esters of the above-described copolymers.

Examples of the nonionic surfactants include polyoxyethylene-alkyl ether type ones, polyoxyethylene-alkylphenol type ones, polyoxyethylene-polyhydric alcohol ester type ones, esters of a polyhydric alcohol with a fatty acid, oxyethylene-oxypropylene block polymers, and the like.

Examples of the anionic surfactants include higher alcohol sulfate, higher fatty acid alkali salts, polyoxyethylenealkylphenol ether sulfate, alkylbenzenesulfonate, naphthalenesulfonate-formalin condensates, alkyldiphenyl ether sulfonate, dialkylsulfosuccinate, higher alcohol phosphoric acid ester salts, and the like.

Furthermore, a plasticizer such as a phthalic acid ester including dibutyl phthalate or a phosphoric acid ester, a pH adjuster such as sodium carbonate, sodium acetate, or sodium phosphate; and the like may be used in combination.

[(II) Method by Post-Emulsification]

At the production of an emulsion by a post-emulsification method, the AA-PVA-based resin is dissolved in water and a polymer containing a repeating structural unit derived from an ethylenically unsaturated monomer and/or a diene-based monomer in a solution form may be added dropwise thereto, followed by stirring, or the PVA aqueous solution may be added dropwise into the polymer solution in a solution form, followed by stirring. At the emulsification, heating or the like is not particularly necessary but, if necessary, the whole may be heated at a temperature of about 45 to 85° C. As a substance to be emulsified, the above-described polymer is preferable and, in addition to the above-described polymer, there may be mentioned epoxy resins, urethane resins, urea-formalin initial condensates, phenol-formaldehyde initial condensates, alkid resins, ketene dimer, rosin, silicon resins, waxes, polypropylene, polyethylene, asphalt, and the like.

The amount of the AA-PVA-based resin slightly varies depending on the required resin content of the emulsion but is usually selected from the range of 0.5 to 40% by weight, preferably about 1 to 35% by weight based on the usual target substance to be emulsified. If necessary, together with the resin, a nonionic surfactant such as polyoxyethylene-alkyl ether type one, polyoxyethylene-alkylphenol type one, or polyhydric alcohol ester type one or a cationic surfactant such as a higher alkylamine salt may be suitably used in combination. Moreover, it is also possible to mix these surfactants into the target substance to be emulsified.

If necessary, not only a nonionic surfactant such as polyoxyethylene-alkyl ether type one, polyoxyethylene-alkylphenol type one, or polyhydric alcohol ester type one or a cationic surfactant such as a higher alkylamine salt but also any of various surfactants to be used at the above-described emulsion polymerization can be employed in combination. Moreover, it is also possible to mix these surfactants into the target substance to be emulsified. Furthermore, a pH adjuster such as phthalic acid ester, sodium acetate, or sodium phosphate may be also used in combination.

[(III) Method by Post-Addition]

This method comprises addition of the AA-PVA-based resin to an emulsion of a synthetic resin obtained by any method. As the emulsion to be targeted, styrene/butadiene-based emulsions, cis-1,4-polyisoprene emulsions, chloroprene emulsions, acrylonitrile/butadiene emulsions, vinylpyridine emulsions, methyl methacrylate/butadiene emulsions, polyurethane emulsions, acryl ester-based emulsions, vinyl acetate-based emulsions, ethylene/vinyl acetate-based emulsions, vinyl chloride-based emulsions, polystyrene emulsions, polyethylene emulsions, silicone emulsions, polybutene emulsions, Thiokol emulsions, and the like. Of these, an emulsion of the polymer containing a repeating structural unit derived from an ethylenicaly unsaturated monomer or a diene-based monomer is preferable.

In the case where the AA-PVA-based resin is added to the emulsion, when the AA-PVA-based resin is added after it is made into an aqueous solution, the emulsion may be merely added to the aqueous solution at room temperature under stirring but, when a powder of the AA-PVA-based resin is added, it is preferable that the powder is added while the emulsion is stirring and the whole is heated to 50 to 85° C., since homogeneous mixing is completed for a short time.

The amount of the emulsion to be used is usually 0.5 to 40% by weight based on the emulsion solid content and further, the range of about 1 to 35% by weight is preferably used. When the amount is too small or too large, the stability of the emulsion tends to decrease.

Moreover, the aqueous emulsion may be one wherein the above-described AA-PVA-based resin is used as a dispersant.

The aqueous emulsion obtained in the above contains the AA-PVA-based resin as mentioned above and the final content ratio of the AA-PVA-based resin in the aqueous emulsion is not particularly limited but is usually 0.1 to 40% by weight, preferably 0.5 to 35% by weight, and particularly 1 to 30% by weight in terms of a solid matter ratio. When the content ratio is too low, adhesive strength and water resistance tend to become low when the emulsion is applied as an adhesive. On the contrary, when the content is too high, the adhesive layer is apt to be swollen with water and thus the adhesive strength tends to decrease when the emulsion is applied as an adhesive. Thus, the cases are not preferable.

It is possible to obtain the aqueous emulsion by using any method of the above-described (I) to (III). Of these, when the adhesive strength, water resistance, freedom on the control of permeability into the base material, and the like are considered, the method of (I) is particularly preferable.

The aqueous emulsion composition of the invention is obtained by blending the crosslinking agent of the invention with the thus obtained aqueous emulsion containing the AA-PVA-based resin as a dispersant and the polymer containing a repeating structural unit derived from an ethylenically unsaturated monomer as a dispersoid. A method of blending the crosslinking agent with the aqueous emulsion is not particularly limited but usually, a method of adding a solution of the crosslinking agent to the aqueous emulsion and mixing them is preferably used.

In this regard, with regard to the blending ratio of the crosslinking agent to the aqueous emulsion, the range of usually 1 to 100 parts by weight, further 5 to 50 parts by weight, particularly 10 to 30 parts by weight based on 100 parts by weight of the AA-PVA-based resin in the aqueous emulsion is suitably used. Moreover, the molar ratio (Y/X) between the total amount (X) of the aldehyde group or the hemiacetal group and acetal group in the crosslinking agent, and the total amount (Y) of the AA group in the AA-PVA-based resin is in the range of usually 0.1 to 10, particularly 0.5 to 5. When the amount of the aldehyde group or the total amount of the hemiacetal group and the acetal group is too small, the water resistance of dried film of the aqueous emulsion becomes insufficient in some cases. On the contrary, when the amount is too large, the aqueous emulsion tends to be thickened depending on the use environment.

In this regard, solid concentration of the aqueous emulsion composition of the invention may be suitably selected depending on the application and purposes thereof, and the range of 10 to 85% by weight is preferably selected, further 20 to 75% by weight, particularly 30 to 65% by weight. When the solid concentration thereof is too small, the composition is not economic and adhesion strength becomes insufficient. On the contrary, when the concentration is too large, there arises a problem that the viscosity of the emulsion becomes too high and workability decreases. Thus, both of these cases are not preferable.

Moreover, to the aqueous emulsion composition of the invention, if necessary, there can be added a thermosetting resin such as a urea/formalin resin, a melamine/formalin resin, or a phenol/formalin resin; a hydrophilic compound having an acetoacetyl group, such as trimethylolpropane triacetate or glycidyl acetoacetate; a filler such as clay, kaolin, or calcium carbonate; a crosslinking agent such as boric acid, a titanium-based compound, a zirconium-based compound, or a hydrazide-based compound; and also various additives such as a pigment, a defoamer, a thickener, an antifreezing agent, an antiseptic agent, and an antilust agent.

The thus obtained aqueous emulsion composition of the invention is used through application on a base material surface, immersion into a base material, or mixing with the other material but, in order to efficiently exhibit water resistance or hot-water resistance which is an object of the invention, it is preferable to perform a heating treatment. The method for the heating treatment is not particularly limited but there may be mentioned a method of applying the aqueous emulsion composition of the invention as an aqueous solution and then performing the heating treatment simultaneously at the drying of water contained therein, a method of performing the drying and then further performing the heat treatment, and the like. As an apparatus for the treatment, a hot-air dryer or infrared heating, or heating by means of a metal roll, a hot press, or the like depending on the applied uses can be used. In this regard, when any method is adopted, the heating treatment is performed under a temperature condition of usually 40 to 200° C., preferably 50 to 180° C., particularly 60 to 160° C. When the temperature is too low, a long period of time is sometimes required until a sufficient water resistance is obtained. On the contrary, when the temperature for the heating treatment is too high, coloring caused by decomposition of PVA sometimes occurs. Thus, the cases are not preferable.

In addition to the above, the crosslinked polymer obtained using the crosslinking agent of the invention can be applied to uses where water resistance is required. As specific examples thereof, the following may be mentioned.

(1) Paper Processing Agents

Pigment binders for sublimation-type heat-sensitive recording media, inorganic fine particle binders and undercoating layers for void-type inkjet recording media, ink-receiving layers and undercoating layers for swelling-type inkjet recording media, clear coating agents for paper, pigment binders for coated paper, pigment binders for electrophotographic recording media, surface coating agents for release paper, coating layer pigment binders for release paper, etc.

(2) Adhesives

Two-component type adhesives, honeymoon type adhesives, pressure-sensitive adhesives, re-wetting agents, binders for non-woven fabrics, binders for building materials (plaster boards, fiber boards, etc.), various powder granulating binders, pressure-sensitive adhesives, fixing agents for anionic paints, etc.

(3) Aqueous Gels

Carriers for waste water treatment, water-holding agents, cold insulators, bioreactors, fragrances, ground-strengthening agents, etc.

(4) Covering Agents

Fiber processing agents, leather-finishing agents, paints, defogging agents, metal-corrosion inhibitors, brighteners for zinc plating, antistatic agents, conducting agents, interim paints, interim protective films, etc.

(5) Films, Membranes

Electrolyte membranes, packaging films, etc.

EXAMPLES

The following will describe the invention with reference to Examples but the invention is not limited to the description of Examples unless it exceeds the gist.

In this regard, in Examples, "part(s)" and "%" mean values on weight basis unless otherwise stated.

Production Example 1

Crosslinking Agent (A1) (Sodium Glyoxylate)

To 456 g (3.10 mol) of a 50% aqueous glyoxylic acid solution was added 645 g (3.22 mol) of a 20% aqueous sodium hydroxide solution. The formed white crystals were filtrated, washed with water, and then dried at 50° C. for 1 hour to obtain 210 g (1.84 mol, yield: 59.5%) of the crosslinking agent (A1) (sodium glyoxylate). Solubility of the crosslinking agent (A1) into water at 23° C. was 17.1%.

In this regard, $^{13}$C-NMR spectrum of the resulting crosslinking agent (A1) (sodium glyoxylate) (using "VARIAN NMR Spectrometer Systems" manufactured by Varian, Inc., internal standard substance: TMS, solvent: heavy water) is as shown in FIG. 1 and the attribution is as follows.

87 ppm: carbon of aldehyde group
176 ppm: carbon of carboxylate group

Production Example 2

Crosslinking Agent (A2) (Calcium Glyoxylate)

To 101 g (0.68 mol) of a 50% aqueous glyoxylic acid solution was added 101 g of water to form a 25% aqueous solution and then 268 g (0.34 mol) of a 20% aqueous calcium acetate solution was added dropwise thereto over a period of 2 hours. The formed white crystals were filtrated, washed with water, and then dried at 50° C. for 1 hour to obtain 70.3 g (0.32 mol, yield: 93.6%) of calcium glyoxylate.

Solubility of the resulting calcium glyoxylate into water at 23° C. was 0.7%.

Figure 2:
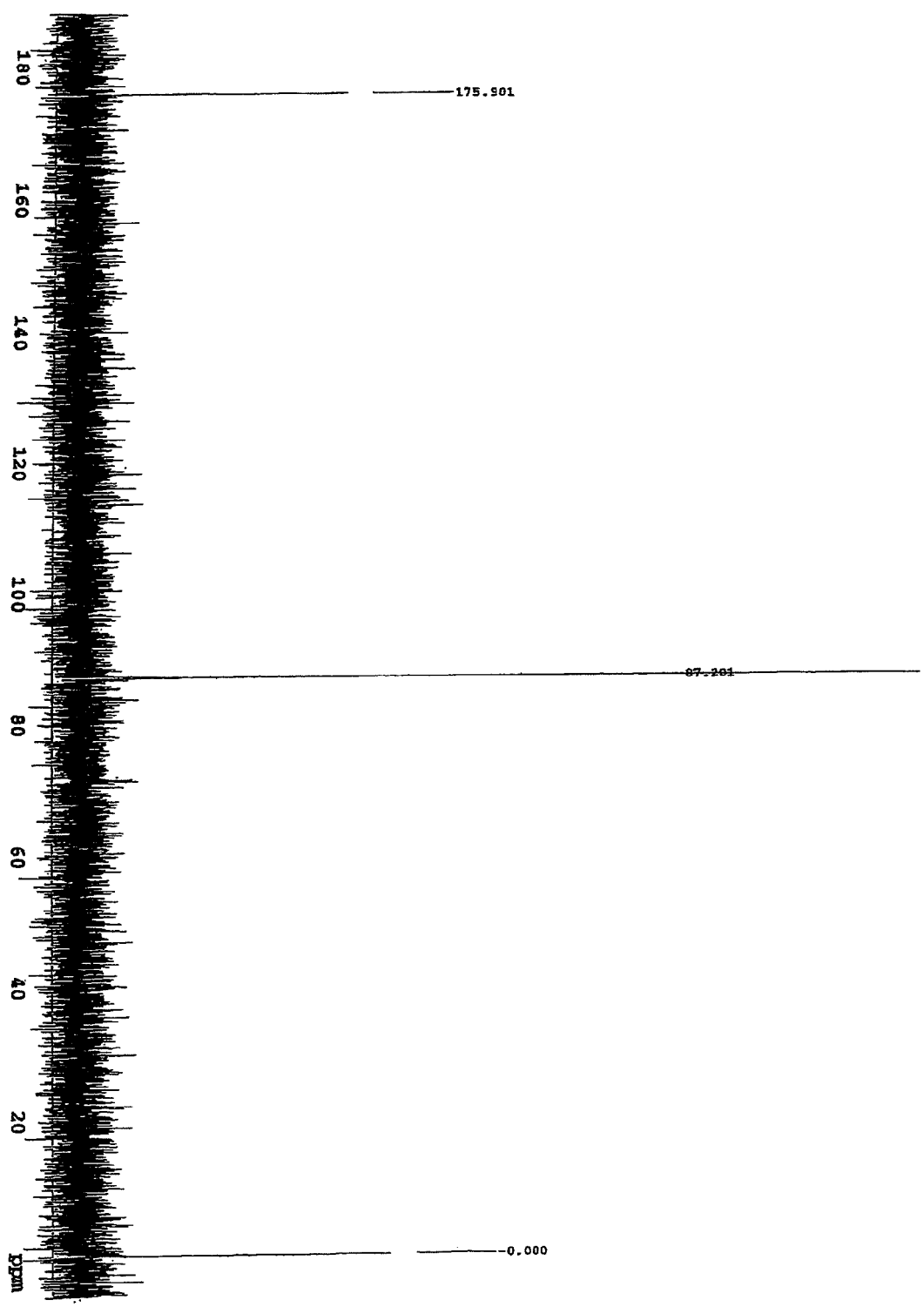
[FIG. 2] $^{13}$C-NMR spectrum of a crosslinking agent (A2) (calcium glyoxylate)

$^{13}$C-NMR spectrum of the resulting crosslinking agent (A2) (calcium glyoxylate) (using "VARIAN NMR Spectrometer Systems" manufactured by Varian, Inc., internal standard substance: TMS, solvent: heavy water) is as shown in FIG. 2 and the attribution is as follows.

87 ppm: carbon of aldehyde group
176 ppm: carbon of carboxylate group

Production Example 3

Crosslinking Agent (A3) (Magnesium Glyoxylate)

To 148 g (1.00 mol) of a 50% aqueous glyoxylic acid solution was added 355.97 g (0.5 mol) of a 20% aqueous magnesium acetate solution. The resulting solution was concentrated by means of an evaporator and further dried at 50° C. for 1 hour to obtain 83.47 g (0.49 mol, yield: 98.0%) of magnesium glyoxylate.

In this regard, solubility of the resulting magnesium glyoxylate into water at 20° C. was 80%.

Production Example 4

Crosslinking Agent (A4) (Aqueous Sodium Glyoxylate Solution)

Glyoxylic monohydrate was dissolved in water to form a 50% aqueous glyoxylic acid solution. Thereto was added 20% sodium hydroxide until pH 9 was attained, thereby a 10.9% aqueous solution of sodium glyoxylate being obtained.

Production Example 5

Crosslinking Agent (B1) (Ethyl Glyoxylate Derivative)

A 50% aqueous glyoxylic acid solution (400 g (2.71 mol)) was concentrated under reduced pressure to form an 85% aqueous glyoxylic acid solution, then 1250 g (27.1 mol) of ethanol and 19.2 g (0.054 mol) of zirconium sulfate tetrahydrate were added thereto, and the whole was heated under reflux for 2 hours to obtain a reaction mixture. After standing to cool to a room temperature, the mixture was concentrated under reduced pressure (40° C., 60 mmHg) to recover unreacted ethanol (875 g). The remaining reaction mixture was flash-distilled under reduced pressure of 60 mmHg to collect 430 g of the fraction of 30° C. to 80° C., which was regarded as the crosslinking agent (B1).

When the crosslinking agent (B1) was analyzed on $^1$H-NMR, it was found that the agent contained about 23% of a hemiacetal compound of a glyoxylic acid ester wherein $R^1$ and $R^2$ are each an ethyl group and $R^3$ is a hydrogen atom in the general formula (1a), about 2% of an acetal compound of a glyoxylic acid ester wherein all of $R^1$, $R^3$ and $R^4$ are each an ethyl group in the general formula (1b), and about 75% of ethanol.

Figure 3:
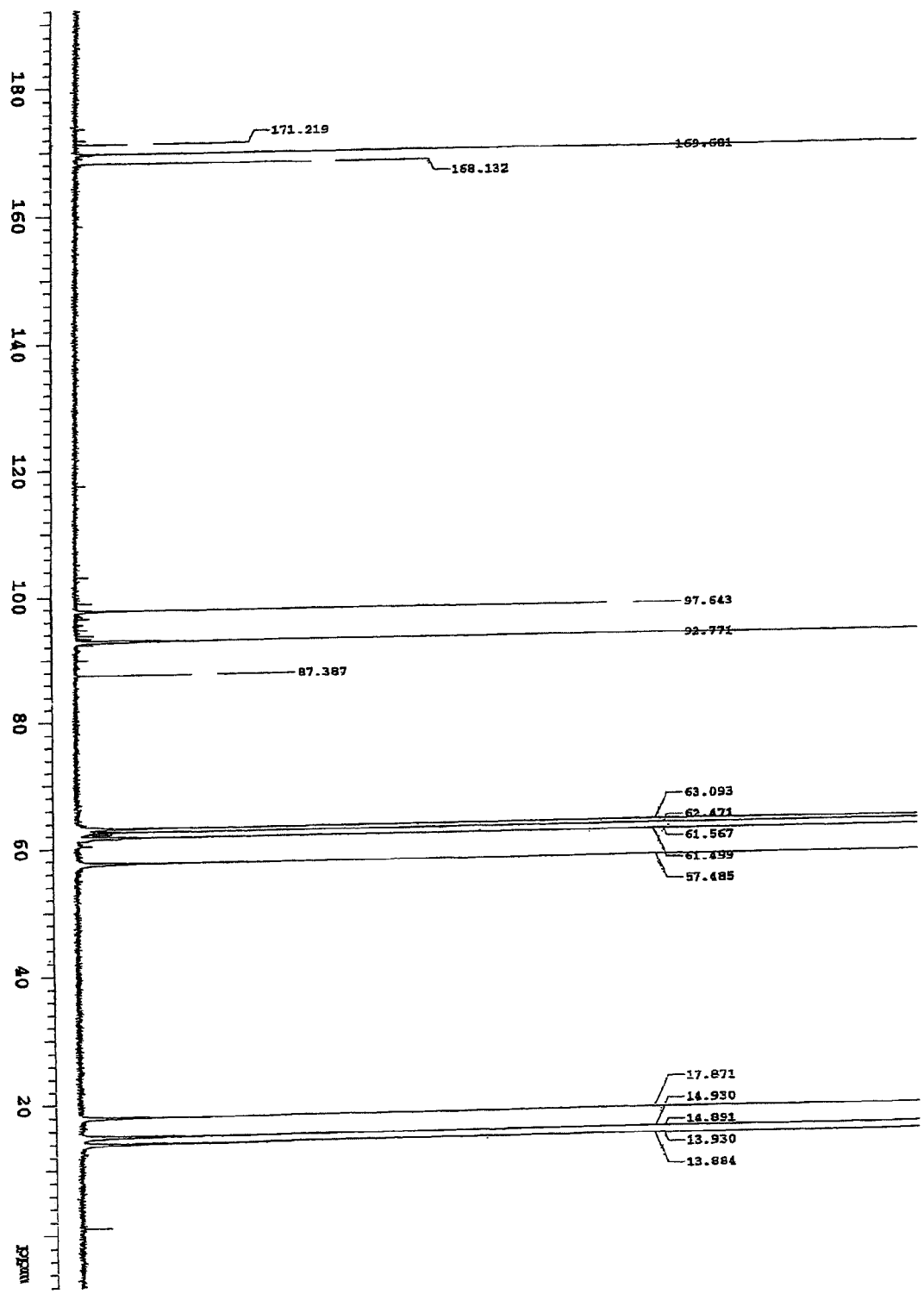
[FIG. 3] $^{13}$C-NMR spectrum of a crosslinking agent (B1) (ethyl glyoxylate derivative)

In this regard, $^{13}$C-NMR spectrum of the resulting crosslinking agent (B1) (using "VARIAN NMR Spectrometer Systems" manufactured by Varian, Inc., internal standard substance: TMS, solvent: heavy water) is as shown in FIG. 3 and the attribution is as follows.

13 to 18 ppm: methyl carbon of ethyl group
57 to 64 ppm: methylene carbon of ethyl group
87 to 98 ppm: carbon of acetal group and hemiacetal group
168 to 172 ppm: carbon of carboxylate group

Production Example 6

Crosslinking Agent (B2) (Methyl Glyoxylate Derivative)

A 50% aqueous glyoxylic acid solution (32.6 g (0.35 mol)) was concentrated under reduced pressure to form an 85% aqueous glyoxylic acid solution, then 112 g (3.49 mol) of methanol and 2.5 g (6.99 mol) of zirconium sulfate tetrahydrate were added thereto, and the whole was heated under reflux for 2 hours to obtain a reaction mixture. After standing to cool to a room temperature, the mixture was concentrated under reduced pressure (40° C., 100 mmHg) to recover unreacted methanol (78.2 g). The remaining reaction mixture was flash-distilled under reduced pressure of 60 mmHg to collect 38.6 g of the fraction of 30° C. to 80° C., which was regarded as the crosslinking agent (B2).

When the crosslinking agent (B2) was analyzed on $^1$H-NMR, it was found that the agent contained about 99% of a hemiacetal compound of a glyoxylic acid ester wherein $R^1$ and $R^2$ are each a methyl group and $R^3$ is a hydrogen atom in the general formula (1a) and about 1% of an acetal compound of a glyoxylic acid ester wherein all of $R^1$, $R^3$ and $R^4$ are each a methyl group in the general formula (1b).

Figure 4:
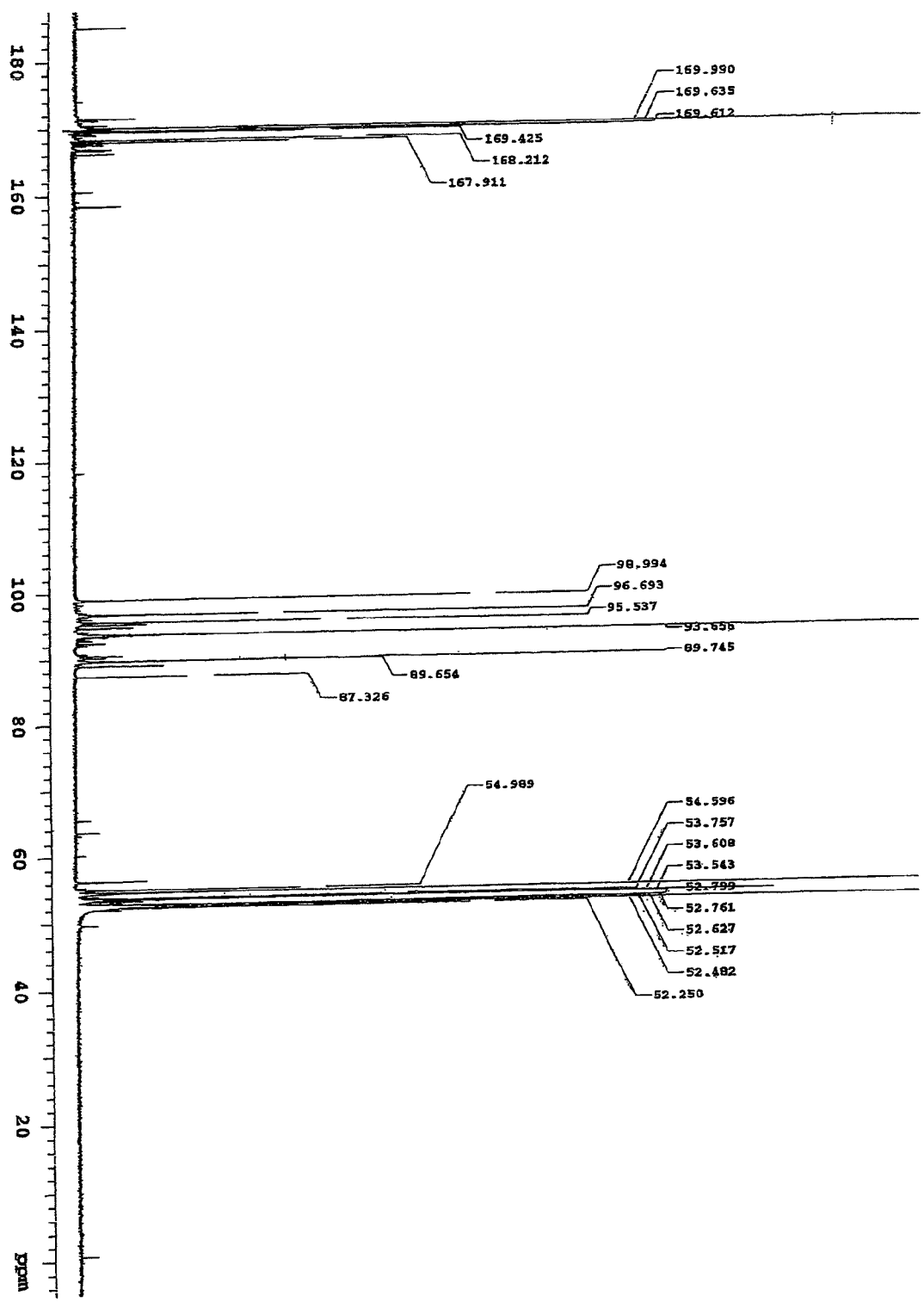
[FIG. 4] $^{13}$C-NMR spectrum of a crosslinking agent (B2) (methyl glyoxylate derivative)

In this regard, $^{13}$C-NMR spectrum of the resulting crosslinking agent (B2) (using "VARIAN NMR Spectrometer Systems" manufactured by Varian, Inc., internal standard substance: TMS, solvent: heavy water) is as shown in FIG. 4 and the attribution is as follows.

52 to 55 ppm: carbon of methyl group
87 to 99 ppm: carbon of acetal group and hemiacetal group
167 to 170 ppm: carbon of carboxylate group

Crosslinked Structure of AA-PVA-Based Resin

Example 1

To 100 parts by weight of a 10% aqueous solution of an AA-PVA-based resin having an average degree of polymerization of 1200, a degree of saponification of 99% by mol, an AA degree of 5.0% by mol, and a hydroxyl group average chain length of 22 was added the crosslinking agent (A1) obtained in Production Example 1 as a crosslinking agent in an amount of 0.5 part by weight (5% by weight based on the AA-PVA-based resin) and then, the whole was mixed and stirred to form an aqueous resin composition solution. The molar ratio (Y/X) between the amount (X) of the aldehyde group in the crosslinking agent and the amount (Y) of the AA group in the AA-PVA-based resin at this time was 2.6.

The aqueous solution was cast on a PET film and the whole was allowed to stand under conditions of 23° C. and 50% RH for 48 hours and then subjected to a heating treatment at 70° C. for 5 minutes to obtain a film having a thickness of 100 μm.

The water resistance and coloring resistance of the obtained film were evaluated in the following manner.
(Water Resistance)

The obtained film was immersed in hot water at 80° C. and the elution ratio (%) of the film was measured. Upon the calculation of the elution ratio (%), dry weight ($X_1$) of the film before immersion in hot water and dry weight ($X_2$) of the film after immersion in hot water (all in terms of "gram") were determined and the elution ratio (%) was calculated according to the following equation. The results are shown in Table 1.

Elution Ratio (%)={($X_1$–$X_2$)/$X_1$}×100

(Coloring Resistance)

A degree of coloring (yellowing) of the film after the obtained film was stored under conditions of 40° C. and 90% RH for 1 week was visually observed and evaluated as follows. The results are shown in Table 1.

A . . . No coloring is observed
B . . . Slight yellowing is observed
C . . . Remarkable yellowing is observed
(Stability of Aqueous Solution)

After the viscosity (a) of a 7% aqueous solution of the obtained resin composition at 23° C. was measured by means of a Brookfield viscometer (manufactured by Brookfield, rotor No. 2, number of rotation: 100 rpm), the aqueous solution was allowed to stand under an atmosphere of 23° C. and the viscosity (b) of the aqueous solution after 6 days was measured. The thickened magnification before and after the standing was shown by (b)/(a).

Example 2

An aqueous resin composition solution was obtained in the same manner as in Example 1 except that the crosslinking agent (A2) (calcium glyoxylate) obtained according to Production Example 2 was used as a crosslinking agent in Example 1. In this regard, the molar ratio (Y/X) between the amount (X) of the aldehyde group in the crosslinking agent and the amount (Y) of the AA group in the AA-PVA-based resin at this time was 2.6. Using the aqueous resin composition solution, a resin composition film was prepared in the same manner as in Example 1 and was similarly evaluated. The results are shown in Table 1.

Example 3

An aqueous resin composition solution was obtained in the same manner as in Example 1 except that the crosslinking agent (A3) (magnesium glyoxylate) obtained according to Production Example 3 was used as a crosslinking agent in Example 1. In this regard, the molar ratio (Y/X) between the amount (X) of the aldehyde group in the crosslinking agent and the amount (Y) of the AA group in the AA-PVA-based resin at this time was 2.6. Using the aqueous resin composition solution, a resin composition film was prepared in the same manner as in Example 1 and was similarly evaluated. The results are shown in Table 1.

Example 4

An aqueous resin composition solution was obtained in the same manner as in Example 1 except that the crosslinking agent (A4) (aqueous sodium glyoxylate solution) obtained in Production Example 4 was used as a crosslinking agent in Example 1. Using the aqueous resin composition solution, a resin composition film was prepared in the same manner as in Example 1 and was similarly evaluated. The results are shown in Table 1.

Example 5

An aqueous resin composition solution was obtained in the same manner as in Example 1 except that the crosslinking agent (B1) (ethyl glyoxylate derivative) obtained according to Production Example 5 was used as a crosslinking agent and the amount added was changed to 0.67 part by weight (assay: 0.6 part by weight, 6% by weight based on the AA-PVA-based resin) based on 100 parts by weight of a 10% aqueous solution of the AA-PVA-based resin in Example 1.

In this regard, the molar ratio (Y/X) between the sum (X) of amounts of the hemiacetal group and the acetal group in the crosslinking agent mixture and the amount (Y) of the AA group in the AA-PVA-based resin at this time was 2.9. Using the aqueous resin composition solution, a resin composition film was prepared in the same manner as in Example 1 and was similarly evaluated. The results are shown in Table 1.

Example 6

A resin composition film was prepared in the same manner as in Example 5 except that the amount of the crosslinking agent (B1) added was changed to 1.36 parts by weight (assay: 1.22 parts by weight, 12.2% by weight based on the AA-PVA-based resin) (Y/X=1.4) in Example 5, and was similarly evaluated. The results are shown in Table 1.

Example 7

A resin composition film was prepared in the same manner as in Example 5 except that the crosslinking agent (B2) (methyl glyoxylate derivative) obtained according to Production Example 6 was used as a crosslinking agent and the amount added was changed to 0.63 part by weight (assay: 0.52 part by weight, 5.2% by weight based on the AA-PVA-based resin) based on 100 parts by weight of a 10% aqueous solution of the AA-PVA-based resin (Y/X=2.3) in Example 5, and was similarly evaluated. The results are shown in Table 1.

Comparative Example 1

A resin composition film was prepared in the same manner as in Example 1 except that a 40% aqueous solution of glyoxal was used as a crosslinking agent and the amount added was changed to 0.25 part by weight (assay: 0.1 part by weight, 1% by weight based on the AA-PVA-based resin) (Y/X=0.8) in Example 1, and was similarly evaluated. The results are shown in Table 1.

Comparative Example 2

A resin composition film was prepared in the same manner as in Example 1 except that a 50% aqueous solution of glyoxylic acid was used as a crosslinking agent and the amount added was changed to 1 part by weight (assay: 0.5 part by weight, 5% by weight based on the AA-PVA-based resin) (Y/X=1.7) in Example 1, and was similarly evaluated. The results are shown in Table 1.

Comparative Example 3

A resin composition film was prepared in the same manner as in Example 1 except that a cyclic acetal compound ("Seqarets 755" manufactured by Omnova, a 55% by weight aqueous solution), a reaction product of glucose with glyoxal, was used as a crosslinking agent and the amount added was changed to 0.45 part by weight (assay: 0.25 part by weight, 2.5% by weight based on the AA-PVA-based resin) (Y/X=6.1) in Example 1, and was similarly evaluated. The results are shown in Table 1.

TABLE 1

|  | Crosslinking agent | Amount added (based on AA-PVA-based resin) (% by weight) | Water resistance (elution ratio) (%) | Coloring resistance | Stability of aqueous solution |
|---|---|---|---|---|---|
| Example 1 | Crosslinking agent (A1) | 5 | 3 | A | 1.2 |
| Example 2 | Crosslinking agent (A2) | 5 | 2 | A | 1.2 |
| Example 3 | Crosslinking agent (A3) | 5 | 14 | A | 1.1 |
| Example 4 | Crosslinking agent (A4) | 5 | 3 | A | 1.1 |

TABLE 1-continued

| | Crosslinking agent | Amount added (based on AA-PVA-based resin) (% by weight) | Water resistance (elution ratio) (%) | Coloring resistance | Stability of aqueous solution |
|---|---|---|---|---|---|
| Example 5 | Crosslinking agent (B1) | 6 | 5 | A | 1.2 |
| Example 6 | Crosslinking agent (B1) | 12.2 | 5 | A | 1.2 |
| Example 7 | Crosslinking agent (B2) | 5.2 | 8 | A | 1.2 |
| Comparative Example 1 | Glyoxal | 1 | 4 | C | Gelled |
| Comparative Example 2 | Glyoxylic acid | 5 | 89 | A | 1.1 |
| Comparative Example 3 | Seqarets 755 | 2.5 | 5 | B | Gelled |

As apparent from these results, when the crosslinking agent of the invention is used as a crosslinking agent for the AA-PVA-based resin, the water resistance of the obtained film is almost equal to that in the case of glyoxal and the discoloring resistance and stability of an aqueous solution are far more superior to those in the case of glyoxal.

Phenol Resin

Example 8

To 9.4 g (0.1 mol) of phenol were added 114 g (0.1 mol) of a 10% aqueous solution of the crosslinking agent (A1) (sodium glyoxylate) obtained in Production Example 1 and 8.9 g (0.06 mol) of a 25% aqueous sodium hydroxide solution, and the whole was heated under reflux for 6 hours to obtain a product wherein sodium glyoxylate was added to phenol.

Figure 5:
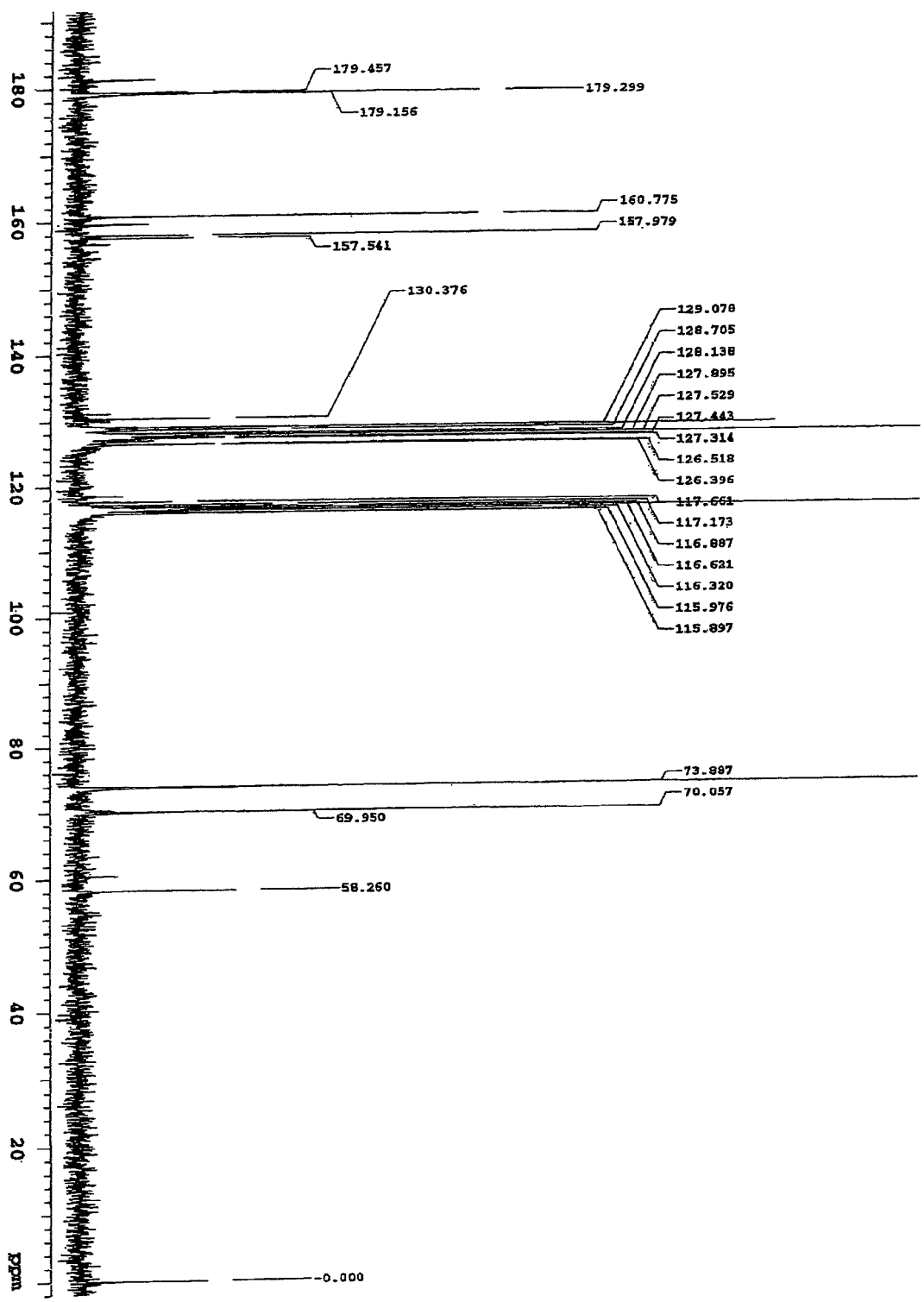
[FIG. 5] $^{13}$C-NMR spectrum of a product obtained by addition of a crosslinking agent (A1) (sodium glyoxylate) to phenol

$^{13}$C-NMR spectrum of the resulting product (using "VARIAN NMR Spectrometer Systems" manufactured by Varian, Inc., internal standard substance: TMS, solvent: heavy water) is as shown in FIG. 5 and the attribution is as follows.

69 to 74 ppm: methine carbon bonded to phenol ring
115 to 131 ppm: carbon at ortho-, meta-, and para-position of phenol ring
154 to 158 ppm: carbon bonded to hydroxyl group of phenol ring
179 to 180 ppm: carbon of carboxylate group According to the above, the chemical shift of carbon of the aldehyde group of sodium glyoxylate used as a raw material is 87 ppm, while the chemical shift of the carbon is changed to 69 to 74 ppm in the product. Therefore, it is obvious that sodium glyoxylate reacts with phenol and the compound represented by the formula (A) is obtained. In this regard, the structure represented by the formula (A) is a representative structure and actually, it is presumed that the compound is a mixture of a mono-adduct to a tri-adduct.

Example 9

A product was obtained in the same manner as in Example 8 except that 11.5 g (0.05 mol) of the crosslinking agent (A2) (calcium glyoxylate) obtained in Production Example 2 was used instead of the crosslinking agent (A 1) in Example 8.

Figure 6:
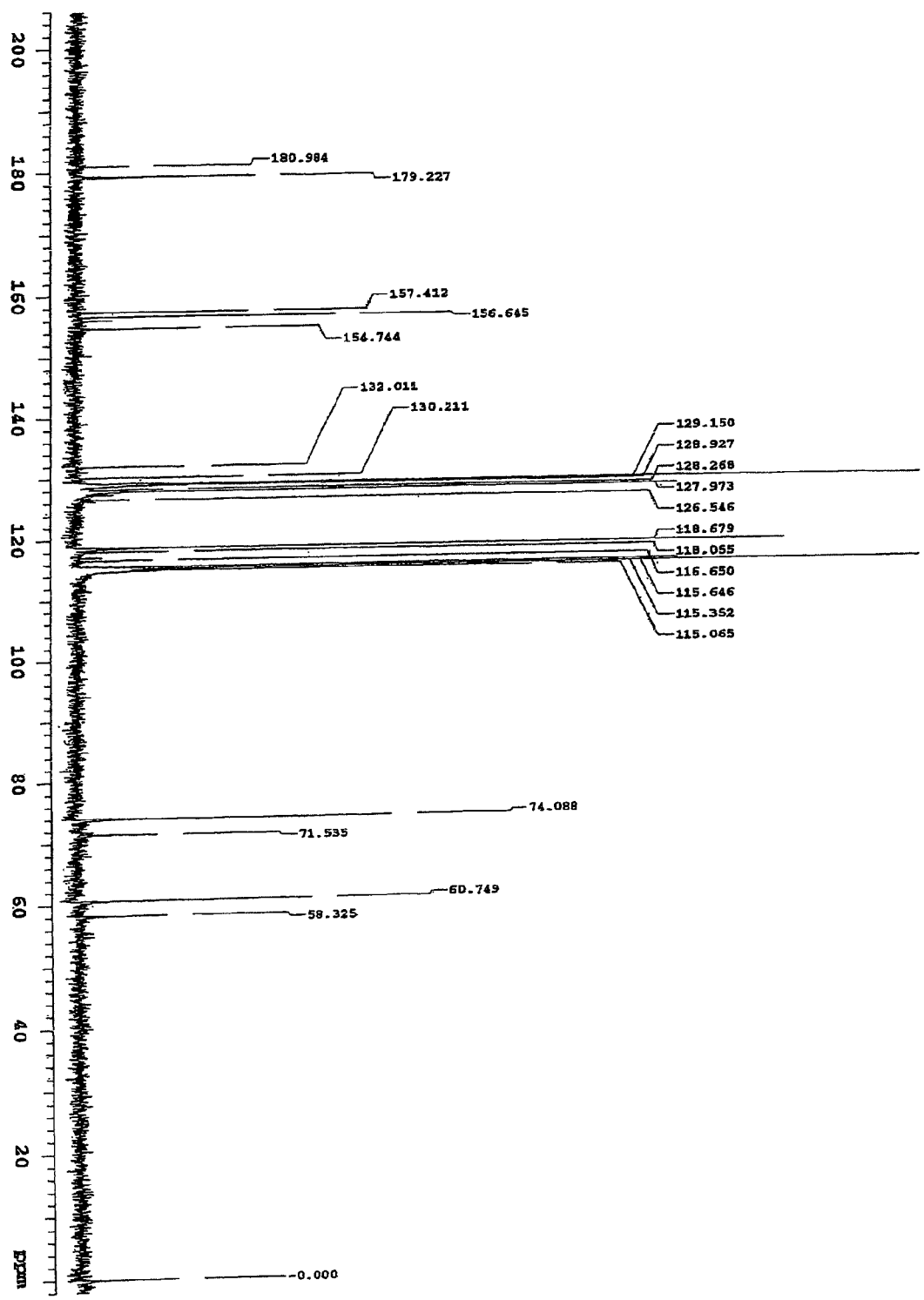
[FIG. 6] $^{13}$C-NMR spectrum of a product obtained by addition of a crosslinking agent (A2) (calcium glyoxylate) to phenol

$^{13}$C-NMR spectrum of the resulting product (using "VARIAN NMR Spectrometer Systems" manufactured by Varian, Inc., internal standard substance: TMS, solvent: heavy water) is as shown in FIG. 6 and the attribution is as follows.

71 to 75 ppm: methine carbon bonded to phenol ring
115 to 133 ppm: carbon at ortho-, meta-, and para-position of phenol ring
154 to 158 ppm: carbon bonded to hydroxyl group of phenol ring
179 to 181 ppm: carbon of carboxylate group Similarly to Example 8, the chemical shift of carbon of the aldehyde group of calcium glyoxylate used as a raw material is 87 ppm, while the chemical shift of the carbon is changed to 69 to 74 ppm in the product. Therefore, it is obvious that the compound represented by the formula (A) is obtained.

Example 10

A product was obtained in the same manner as in Example 8 except that, in Example 8, 64.4 g (0.1 mol) of the crosslinking agent (B1) (23% ethanol solution of ethyl glyoxylate derivative) obtained in Production Example 5 was used instead of the crosslinking agent (A1) and a reaction is carried out after 100 g of water is further added.

Figure 7:
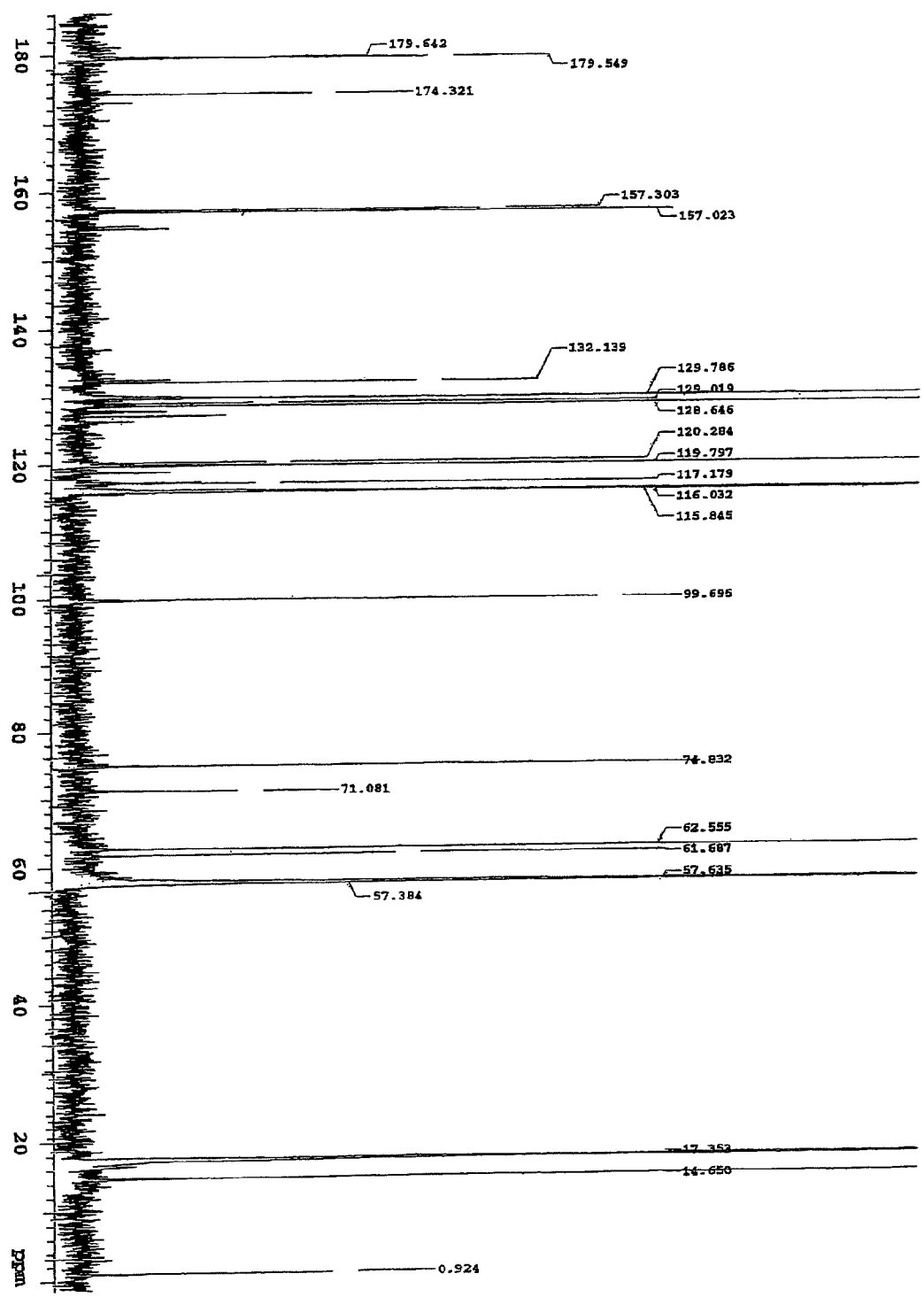
[FIG. 7] $^{13}$C-NMR spectrum of a product obtained by addition of a crosslinking agent (B1) (ethyl glyoxylate derivative) to phenol

$^{13}$C-NMR spectrum of the resulting product (using "VARIAN NMR Spectrometer Systems" manufactured by Varian, Inc., internal standard substance: TMS, solvent: heavy water) is as shown in FIG. 7 and the attribution is as follows.

71 to 75 ppm: methine carbon bonded to phenol ring
115 to 133 ppm: carbon at ortho-, meta-, and para-position of phenol ring
157 to 158 ppm: carbon bonded to hydroxyl group of phenol ring
174 to 180 ppm: carbon of carboxylate group Similarly to Example 8, the chemical shifts of carbon of the acetal/hemiacetal groups of ethyl glyoxylate derivative used as a raw material are 87 to 98 ppm, while the chemical shifts of the carbon are changed to 71 to 75 ppm. Therefore, it is obvious that the compound represented by the formula (A) is obtained.

Example 11

A product was obtained in the same manner as in Example 8 except that, in Example 8, 12 g (0.1 mol) of the crosslinking agent (B2) (methyl glyoxylate derivative) obtained in Production Example 6 was used instead of the crosslinking agent (A1), the 25% sodium hydroxide solution was used in an amount of 26.9 g, and a reaction is carried out after 100 g of water is further added.

Figure 8:
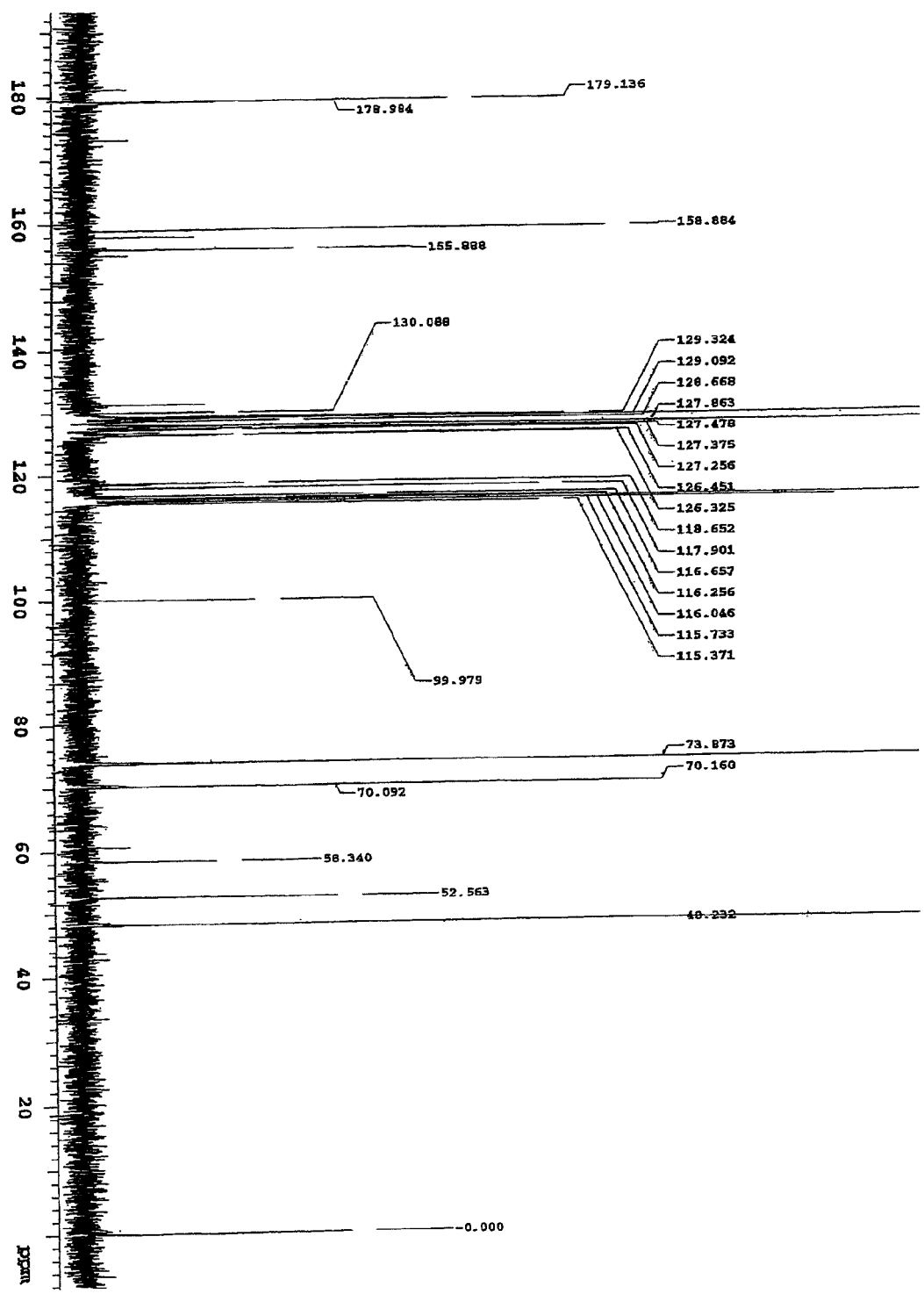
[FIG. 8] $^{13}$C-NMR spectrum of a product obtained by addition of a crosslinking agent (B2) (methyl glyoxylate derivative) to phenol

$^{13}$C-NMR spectrum of the resulting product (using "VARIAN NMR Spectrometer Systems" manufactured by Varian, Inc., internal standard substance: TMS, solvent: heavy water) is as shown in FIG. 8 and the attribution is as follows.

70 to 74 ppm: methine carbon bonded to phenol ring
115 to 131 ppm: carbon at ortho-, meta-, and para-position of phenol ring
155 to 159 ppm: carbon bonded to hydroxyl group of phenol ring
178 to 180 ppm: carbon of carboxylate group Similarly to Example 8, the chemical shifts of carbon of the acetal/hemiacetal groups of methyl glyoxylate derivative used as a raw material are 87 to 99 ppm, while the chemical shifts of the carbon are changed to 70 to 74 ppm in the product. Therefore, it is obvious that the compound represented by the formula (A) is obtained.

Polarizer

Example 12

A PVA film having a thickness of 50 μm comprising a PVA-based resin having a degree of polymerization of 2600 and a degree of saponification of 99.8% by mol was immersed in water at 30° C., then was immersed and stretched in a staining solution containing 0.2 g/L of iodine and 20 g/L of potassium iodide at 30° C., and was immersed and stretched in a boric acid treatment solution containing 50 g/L of boric acid and 50 g/L of potassium iodide to obtain a polarizing film having a stretching magnification of 4.0 times and a thickness of 28 μm.

To 100 parts by weight of a 5% aqueous solution of the AA-PVA-based resin (average degree of polymerization: 1200, degree of saponification: 99% by mol, AA degree: 5.0% by mol, hydroxyl group average chain length: 22) similar to one used in Example 1 was added 0.25 part by weight of the crosslinking agent (A1) (sodium glyoxylate) obtained in Production Example 1 as a crosslinking agent, and the whole was mixed and stirred to form an aqueous resin composition solution.

A protective film comprising triacetyl cellulose having a thickness of 80 μm was pasted onto both surfaces of the polarizing film through the resin composition solution and was laminated under a pressure of 0.33 MPa, and the whole was dried at 80° C. for 10 minutes to obtain a polarizer.

The sample having a size of 100 mm×50 mm was cut out of the obtained polarizer using the stretching direction of the polarizing film as a long side, and was used as a sample for evaluation. About 80 mm of the long side of the sample was immersed in water at 24° C. for 15 hours, then it was taken out to wipe the water on the surface. A decolored extent (distance from the edge) at the central part of the short side of the sample in the immersed part was measured. This evaluates the water resistance of the adhesion of the crosslinked polymer of the invention used as an adhesive for the polarizing film and the protective film. When the water resistance of the adhesion is low, the adhered part is peeled off and, by penetration of water therefrom, iodine is eluted from the polarizing film and thus decoloring occurs. The results are shown in Table 2.

Examples 13 to 22

A polarizer was prepared in the same manner as in Examples 12 except that, in Example 12, the crosslinking agent in the resin composition used as an adhesive and the amount added are as shown in Table 2, and was similarly evaluated. The results are shown in Table 2. In this regard, in Example 22, methyl hemiacetal of methyl glyoxylate purchased as a reagent was used as a crosslinking agent. The results are shown in Table 2.

Comparative Examples 4 to 7

A polarizer was prepared in the same manner as in Examples 8 except that, in Example 12, a 40% aqueous solution of glyoxal and methylol-melamine ("Sumimall M-30W" manufactured by Sumitomo Chemical Co., Ltd. or Chang Chun Plastics Co., Ltd.) and the amount added are as shown in Table 2, and was similarly evaluated. The results are shown in Table 2.

TABLE 2

| | Crosslinking agent | Amount added (based on AA-PVA) (% by weight) | Decolored extent (mm) |
|---|---|---|---|
| Example 12 | Crosslinking agent (A1) | 5 | 0 |
| Example 13 | Crosslinking agent (A1) | 10 | 0 |
| Example 14 | Crosslinking agent (A1) | 50 | 0 |
| Example 15 | Crosslinking agent (A1) | 100 | 0 |
| Example 16 | Crosslinking agent (A2) | 5 | 0 |
| Example 17 | Crosslinking agent (A3) | 5 | 0.5 |
| Example 18 | Crosslinking agent (B1) | 6.6 | 0 |
| Example 19 | Crosslinking agent (B1) | 13.2 | 0 |
| Example 20 | Crosslinking agent (B1) | 66.2 | 0 |
| Example 21 | Crosslinking agent (B1) | 132 | 0 |
| Example 22 | Methyl glyoxylate methyl hemiacetal | 5.7 | 0 |
| Comparative Example 4 | Glyoxal | 1 | 18 |
| Comparative Example 5 | Glyoxal | 5 | 15 |
| Comparative Example 6 | Methylol-melamine | 10 | 0.5 |
| Comparative Example 7 | Methylol-melamine | 10 | 1 |

As apparent form these results, the polarizer obtained using the crosslinked polymer comprising the AA-PVA-based resin and the crosslinking agent of the invention as an adhesive has a small decolored extent and exhibits an excellent water-resistant adhesiveness as compared with that using glyoxal as a crosslinking agent.

Heat-Sensitive Recording Paper

Example 23

A coating solution for a protective layer was prepared by blending 100 parts by weight of a 10% aqueous solution of the AA-PVA-based resin (average degree of polymerization: 1200, degree of saponification: 99% by mol, AA degree: 5.0% by mol, hydroxyl group average chain length: 22) similar to one used in Example 1, 0.5 part by weight (5% by weight based on the AA-PVA-based resin) of the crosslinking agent (A1) (sodium glyoxylate) obtained in Production Example 1, 25 parts by weight of kaolin ("UW-90" manufactured by Engelhard Corporation), 9.36 parts by weight of a 40% aqueous solution of zinc stearate ("Himicron F-930" manufactured by Chukyo Yushi Co., Ltd.), and water so that the total amount becomes 200 parts by weight.

The obtained coating solution for a protective layer was applied on the surface of the heat-sensitive coloring layer of a commercially available facsimile paper (manufactured by Kyowa Shiko Co., Ltd.) by means of an applicator so that the coated amount was 10 g/m² in terms of solid matter and was dried at 70° C. for 5 minutes to fabricate a protective layer.

Further, a similar operation was also performed on the reverse side to obtain a heat-sensitive recording paper having a protective layer on both surfaces.

(Water Resistance)

The obtained heat-sensitive recording paper was pressed onto a hot plate at 120° C. under a pressure of 1 kg/cm² for 10 seconds to develop color and the color density ($C_1$) was measured by means of a Macbeth densitometer ("RD-100R Model" manufactured by Macbeth, using amber field). After the paper was immersed in water at 24° C. for 10 hours, it was dried on standing, the color density ($C_2$) was similarly measured, and water resistance was determined according to the following equation. The results are shown in Table 3.

$$\text{Water Resistance} = C_2/C_1$$

(Discoloring Resistance)

A yellow index (YI) value ($Y_1$) of the obtained heat-sensitive recording paper was measured by means of a color-difference meter ("SZ-Σ90" manufactured by Nippon Denshoku Industries Co., Ltd., reflection method). The paper was allowed to stand under atmosphere of 40° C. and 90% RH for 5 days, a YI value ($Y_2$) thereof was similarly measured, and discoloring resistance was determined according to the following equation. The results are shown in Table 3.

$$\text{Discoloring Resistance} = Y_2/Y_1$$

Examples 24 to 31

Comparative Examples 8 and 9

A heat-sensitive recording paper having a protective layer was prepared in the same manner as in Examples 23 except that, in Example 23, the crosslinking agent used in the coating solution for a protective layer and the amount blended are as shown in Table 3, and was similarly evaluated. In this regard, in Example 31, methyl hemiacetal of methyl glyoxylate purchased as a reagent was used as a crosslinking agent. The results are shown in Table 3.

TABLE 3

| | Crosslinking agent | Amount added (based on AA-PVA) (% by weight) | Water resistance | Discoloring resistance |
|---|---|---|---|---|
| Example 23 | Crosslinking agent (A1) | 5 | 0.89 | 1.1 |
| Example 24 | Crosslinking agent (A1) | 10 | 0.93 | 1.1 |
| Example 25 | Crosslinking agent (A1) | 50 | 0.95 | 1.1 |
| Example 26 | Crosslinking agent (A2) | 5 | 0.93 | 1.1 |
| Example 27 | Crosslinking agent (A3) | 5 | 0.88 | 1.0 |
| Example 28 | Crosslinking agent (B1) | 6.5 | 0.90 | 1.1 |
| Example 29 | Crosslinking agent (B1) | 13 | 0.91 | 1.1 |
| Example 30 | Crosslinking agent (B1) | 65 | 0.91 | 1.1 |
| Example 31 | Methyl glyoxylate methyl hemiacetal | 5 | 0.86 | 1.0 |
| Comparative Example 8 | Glyoxal | 5 | 0.85 | 2.1 |
| Comparative Example 9 | Glyoxylic acid | 5 | 0.45 | 1.1 |

As apparent from these results, the heat-sensitive recording paper containing the crosslinked polymer comprising the AA-PVA-based resin and the crosslinking agent of the invention in the protective layer shows an excellent discoloring resistance as compared with one using glyoxal as a crosslinking agent and shows an excellent water resistance as compared with one using glyoxylic acid.

Aqueous Emulsion Composition Containing AA-PVA-Based Resin as Emulsifier

Example 32

To a reactor were added 136 parts by weight of water, 27.3 parts by weight of an AA-PVA-based resin (average degree of polymerization: 500, degree of saponification: 99% by mol, acetoacetic acid ester group content: 5% by mol), and 2.7 parts by weight of an AA-PVA-based resin (average degree of polymerization: 1200, degree of saponification: 99% by mol, acetoacetic acid ester group content: 7% by mol). After the temperature was elevated to 75° C., 100 parts by weight of vinyl acetate and 0.5 part by weight of 35% hydrogen peroxide solution were simultaneously added dropwise over a period of 3.5 hours to effect emulsion polymerization. After the whole was further aged for 1 hour, 10 parts by weight of dibutyl phthalate was added thereto as a plasticizer, the whole was cooled, and then the concentration was adjusted to 43% to obtain an aqueous emulsion of vinyl acetate resin using the AA-PVA-based resins as emulsifiers.

Into 23 parts by weight of the obtained aqueous emulsion were added 2.1 parts by weight of a 10% aqueous solution of the crosslinking agent (A 1) (sodium glyoxylate) obtained in Production Example 1 and 77 parts by weight of water. The molar ratio (Y/X) between the amount (X) of the aldehyde group in the crosslinking agent and the amount (Y) of the AA group in the AA-PVA-based resin contained in the aqueous emulsion at this time was 1.0.

The obtained aqueous emulsion composition was cast on a PET film, followed by allowing to stand under conditions of 23° C. and 50% RH for 1 day, and then subjecting to a heating treatment at 70° C. for 5 minutes to obtain a dry film (thickness: 138 μm) of the aqueous emulsion composition.

The water resistance of the obtained film was evaluated in the following manner.

(Water Resistance)

The obtained film was immersed for 4 hours in hot water adjusted to 80° C. and the elution ratio (%) of the film was measured. In this regard, upon the calculation of the elution ratio (%), the dry weight ($X_5$) of the film before the solvent immersion and the dry weight ($X_6$) of the film after the solvent immersion (all in terms of "gram") were determined and the elution ratio (%) was calculated according to the following equation. The results are shown in Table 4.

$$\text{Elution Ratio (\%)} = \{(X_5 - X_6)/X_5\} \times 100$$

Example 33

An aqueous emulsion composition was obtained in the same manner as in Example 32 except that the crosslinking agent (A2) (calcium glyoxylate) obtained according to Production Example 2 was used as a crosslinking agent and the amount blended was 0.21 part by weight in Example 32. In this regard, the molar ratio (Y/X) between the amount (X) of the aldehyde group in the crosslinking agent and the amount (Y) of the AA group in the AA-PVA-based resin contained in the aqueous emulsion at this time was 1.0. Using the aqueous emulsion composition, a film was prepared in the same manner as in Example 32 and was similarly evaluated. The results are shown in Table 4.

Example 34

An aqueous emulsion composition was obtained in the same manner as in Example 32 except that the crosslinking agent (B1) (23% ethanol solution of ethyl glyoxylate derivative) obtained according to Production Example 5 was used as a crosslinking agent and the amount blended was 0.7 part by weight in Example 32. In this regard, the molar ratio (Y/X) between the sum (X) of the amounts of the hemiacetal group and acetal group in the crosslinking agent and the amount (Y) of the AA group in the AA-PVA-based resin contained in the aqueous emulsion at this time was 2.0. Using the aqueous emulsion composition, a film was prepared in the same manner as in Example 32 and was similarly evaluated. The results are shown in Table 4.

Comparative Example 10

An aqueous emulsion composition was obtained in the same manner as in Example 32 except that a 40% aqueous solution of glyoxal was used as a crosslinking agent and the amount blended was 0.53 part by weight in Example 32. In this regard, the molar ratio (Y/X) between the amount (X) of the aldehyde group in the crosslinking agent and the amount (Y) of the AA group in the AA-PVA-based resin contained in the aqueous emulsion at this time was 1.0. Using the aqueous emulsion composition, a film was prepared in the same manner as in Example 32 and was similarly evaluated. The results are shown in Table 4.

Comparative Example 11

An aqueous emulsion composition was obtained in the same manner as in Example 32 except that a 50% aqueous solution of glyoxylic acid was used as a crosslinking agent and the amount blended was 0.43 part by weight in Example 32. In this regard, the molar ratio (Y/X) between the amount (X) of the aldehyde group in the crosslinking agent and the amount (Y) of the AA group in the AA-PVA-based resin contained in the aqueous emulsion at this time was 1.0. Using the aqueous emulsion composition, a film was prepared in the same manner as in Example 32 and was similarly evaluated. The results are shown in Table 4.

TABLE 4

| | Crosslinking agent | Water resistance (elution ratio) (%) |
|---|---|---|
| Example 32 | Crosslinking agent (A1) | 7.6 |
| Example 33 | Crosslinking agent (A2) | 7.2 |
| Example 34 | Crosslinking agent (B1) | 11.4 |
| Comparative Example 10 | Glyoxal | 17.0 |
| Comparative Example 11 | Glyoxylic acid | 25.9 |

As apparent from these results, when the crosslinking agent of the invention was used as a crosslinking agent for the aqueous emulsion using the AA-PVA-based resin as the emulsifier, the water resistance of the obtained dry film showed a far more excellent result as compared with the case where glyoxal or glyoxylic acid is used as a crosslinking agent.

Aqueous Emulsion Composition of AA-PVA-based Resin

Example 35

To a reactor were added 422 parts by weight of water, 6 parts by weight of a 50% aqueous solution of sodium polyoxyethylene alkylaryl ether sulfate ("Hostapal BV CONC" manufactured by Clariant (Japan) K.K.), and 7 parts by weight of an 80% aqueous solution of polyoxyethylene nonylphenyl ether ("Newcol 568" manufactured by Nippon Nyukazai Co., Ltd.) (preliminary addition). While the temperature was controlled to 80° C., 400 parts by weight of water, 1.8 parts by weight of sodium acetate, 11 parts by weight of sodium alkyldiphenyl ether disulfonate ("Dowfax 2A1" manufactured by Nippon Nyukazai Co., Ltd., a 50% aqueous solution), 11 parts by weight of a 50% aqueous solution of sodium polyoxyethylene alkylaryl ether sulfate ("Hostapal BV CONC" manufactured by Clariant (Japan) K.K.), and 7 parts by weight of an 80% aqueous solution of polyoxyethylene nonylphenyl ether ("Newcol 568" manufactured by Nippon Nyukazai Co., Ltd.), 210 parts by weight of methyl methacrylate, 225 parts by weight of butyl acrylate, 28 parts by weight of 80% acrylic acid, 315 parts by weight of styrene, one obtained by emulsifying and mixing 22.5 parts by weight of acetoacetoxyethyl methacrylate (emulsified monomer), and 87.5 parts by weight of 3% potassium persulfate as a polymerization initiator were added dropwise thereto to effect emulsion polymerization. After completion of the polymerization, the whole was cooled and neutralized with ammonia water (10% ammonia) and water was added to adjust a nonvolatile content to 47%, thereby an aqueous emulsion of an acryl-styrene-based resin containing the AA group being obtained.

Into 21 parts by weight of the obtained aqueous emulsion were blended 2.25 parts by weight of a 10% aqueous solution of the crosslinking agent (A1) (sodium glyoxylate) obtained in Production Example 1, 1.1 parts by weight of texanol as a film-forming auxiliary, and 79 parts by weight of water. The molar ratio (Y/X) between the amount (X) of the aldehyde group in the crosslinking agent and the amount (Y) of the AA group in the AA-resin emulsion at this time was 1.0.

The obtained aqueous emulsion composition was cast on a PET film, followed by allowing to stand under conditions of 23° C. and 50% RH for 1 day, and then subjecting to a heating treatment at 70° C. for 5 minutes to obtain a dry film (thickness: 157 μm) of the aqueous emulsion composition.

The solvent resistance of the obtained film was evaluated in the following manner.

(Solvent Resistance)

The obtained film was immersed for 4 hours in each solvent of toluene, methyl ethyl ketone, and methanol and the elution ratio (%) of the film was measured. In this regard, upon the calculation of the elution ratio (%), the dry weight ($X_3$) of the film before the solvent immersion and the dry weight ($X_4$) of the film after the solvent immersion (all in terms of "g") were determined and the elution ratio (%) was calculated according to the following equation. The results are shown in Table 5.

Elution Ratio (%)={($X_3$−$X_4$)/$X_3$}×100

Example 36

An aqueous emulsion composition was obtained in the same manner as in Example 35 except that the crosslinking agent (A2) (calcium glyoxylate) obtained according to Production Example 2 was used as a crosslinking agent and the amount blended was 0.24 part by weight in Example 35. In this regard, the molar ratio (Y/X) between the amount (X) of the aldehyde group in the crosslinking agent and the amount (Y) of the AA group in the AA-resin emulsion at this time was 1.0. Using the aqueous emulsion composition, a film was prepared in the same manner as in Example 35 and was similarly evaluated. The results are shown in Table 5.

Example 37

An aqueous emulsion composition was obtained in the same manner as in Example 35 except that the crosslinking agent (B1) (23% ethanol solution of ethyl glyoxylate derivative) obtained according to Production Example 5 was used as a crosslinking agent and the amount blended was 0.8 part by weight in Example 35. In this regard, the molar ratio (Y/X) between the sum (X) of the amounts of the hemiacetal group and acetal group in the crosslinking agent and the amount (Y) of the AA group in the AA-resin emulsion at this time was 2.0. Using the aqueous emulsion composition, a film was prepared in the same manner as in Example 35 and was similarly evaluated. The results are shown in Table 5.

Comparative Example 12

An aqueous emulsion composition was obtained in the same manner as in Example 35 except that a 40% aqueous solution of glyoxal was used as a crosslinking agent and the amount blended was 0.56 part by weight in Example 35. In this regard, the molar ratio (Y/X) between the amount (X) of the aldehyde group in the crosslinking agent and the amount (Y) of the AA group in the AA-resin emulsion at this time was 1.0. Using the aqueous emulsion composition, a film was prepared in the same manner as in Example 35 and was similarly evaluated. The results are shown in Table 5.

Comparative Example 13

An aqueous emulsion composition was obtained in the same manner as in Example 35 except that a 50% aqueous solution of glyoxylic acid as a crosslinking agent and the amount blended was 0.45 part by weight. In this regard, the molar ratio (Y/X) between the amount (X) of the aldehyde group in the crosslinking agent and the amount (Y) of the AA group in the AA-resin emulsion at this time was 1.0. Using the aqueous emulsion composition, a film was prepared in the same manner as in Example 35 and was similarly evaluated. The results are shown in Table 5.

TABLE 5

|  | Crosslinking agent | Solvent resistance (elution ratio) (%) | | |
|---|---|---|---|---|
|  |  | Toluene | Methyl ethyl ketone | Methanol |
| Example 35 | Crosslinking agent (A1) | 6.8 | 10.8 | 12.5 |
| Example 36 | Crosslinking agent (A2) | 9.2 | 11.7 | 10.8 |
| Example 37 | Crosslinking agent (B1) | 8.9 | 10.0 | 10.0 |
| Comparative Example 12 | Glyoxal | 20.8 | 34.9 | 19.5 |
| Comparative Example 13 | Glyoxylic acid | 18.3 | 25.8 | 19.0 |

As apparent from these results, when the crosslinking agent of the invention is used as a crosslinking agent for the aqueous emulsion of the AA-PVA-based resin, the solvent resistance of the obtained dry film against various solvents showed a far more excellent result as compared with the case where glyoxal or glyoxylic acid is used as a crosslinking agent.

While the invention has been described in detail and with reference to specific embodiments thereof, it will be apparent to one skilled in the art that various changes and modifications can be made therein without departing from the spirit and scope thereof.

This application is based on Japanese Patent Application No. 2007-225012 filed on Aug. 31, 2007, Japanese Patent Application No. 2008-069645 filed on Mar. 18, 2008, Japanese Patent Application No. 2008-098282 filed on Apr. 4, 2008, Japanese Patent Application No. 2008-103494 filed on Apr. 11, 2008, Japanese Patent Application No. 2008-114149 filed on Apr. 24, 2008 and Japanese Patent Application No. 2008-114150 filed on Apr. 24, 2008, and their contents are incorporated herein by reference.

INDUSTRIAL APPLICABILITY

The crosslinking agent of the present invention is suitable as a crosslinking agent for use in crosslinked polymer fabrication and has properties that the agent is excellent in safety with no odor contrary to formaldehyde that is frequently used in thermosetting resins such as urea resins, melamine resins, and phenol resins.

Moreover, the crosslinking agent of the invention is useful as a crosslinking agent for linear polymers, especially acetoacetyl group-containing PVA-based resins and has properties that the agent is excellent in storage stability of an aqueous solution obtained by mixing both and a pot life in use is long. Moreover, since a good crosslinked structure is fabricated, the crosslinked polymer obtained by crosslinking this has properties that the crosslinked polymer is excellent in water resistance and shows no coloring with time, and thus the polymer is useful as an adhesive layer between a polarizing film and a protective film in polarizers, a protective layer for heat-sensitive recording media, and the like.

The invention claimed is:

1. A composition for forming an acetoacetyl group-containing resin comprising at least one metal salt of glyoxylic acid and at least one acetoacetyl group-containing linear polymer.

2. The crosslinking agent according to claim 1, wherein the metal salt of glyoxylic acid is at least one metal salt of glyoxylic acid selected from an alkali metal salt of glyoxylic acid and an alkaline earth metal salt of glyoxylic acid.

3. An aqueous emulsion composition comprising an acetoacetyl group-containing polyvinyl alcohol-based resin as a dispersant, a polymer containing a repeating structural unit derived from an ethylenically unsaturated monomer as a dispersoid, and the crosslinking agent according to claim 1.

4. An aqueous emulsion composition comprising an acetoacetyl group-containing resin as a dispersoid and the crosslinking agent according to claim 1.

* * * * *